United States Patent
Hayasaka et al.

(10) Patent No.: US 12,421,375 B2
(45) Date of Patent: Sep. 23, 2025

(54) LATEX COMPOSITION FOR DIP MOLDING AND DIP-MOLDED ARTICLE

(71) Applicant: ZEON CORPORATION, Tokyo (JP)

(72) Inventors: Kentaro Hayasaka, Tokyo (JP); Kunihiko Makino, Tokyo (JP); Tomoya Taniyama, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 951 days.

(21) Appl. No.: 17/297,664

(22) PCT Filed: Nov. 27, 2019

(86) PCT No.: PCT/JP2019/046304
§ 371 (c)(1),
(2) Date: May 27, 2021

(87) PCT Pub. No.: WO2020/111097
PCT Pub. Date: Jun. 4, 2020

(65) Prior Publication Data
US 2022/0041845 A1    Feb. 10, 2022

(30) Foreign Application Priority Data

Nov. 30, 2018  (JP) ................................. 2018-225367
Mar. 29, 2019  (JP) ................................. 2019-067764
Oct. 30, 2019  (JP) ................................. 2019-197025
Oct. 30, 2019  (JP) ................................. 2019-197026

(51) Int. Cl.
*C08L 9/04* (2006.01)
*C08K 3/06* (2006.01)
*B29C 41/14* (2006.01)
*C08L 27/06* (2006.01)

(52) U.S. Cl.
CPC ................... *C08L 9/04* (2013.01); *C08K 3/06* (2013.01); *B29C 41/14* (2013.01); *C08L 27/06* (2013.01); *C08L 2312/00* (2013.01)

(58) Field of Classification Search
CPC ............... C08L 27/06; C08L 9/10; C08L 9/04
See application file for complete search history.

(56) References Cited

U.S. PATENT DOCUMENTS

| | | | |
|---|---|---|---|
| 3,097,180 A | 7/1963 | Tausch et al. | |
| 5,869,569 A * | 2/1999 | Arai | C09D 133/06 106/3 |
| 2005/0058698 A1 * | 3/2005 | Nolan | A61K 31/685 435/458 |
| 2010/0204397 A1 * | 8/2010 | Kobayashi | C08L 21/02 524/575 |
| 2010/0330319 A1 | 12/2010 | Tsukada et al. | |
| 2014/0100315 A1 | 4/2014 | Tsukada et al. | |
| 2014/0346533 A1 * | 11/2014 | Andrews | A61K 40/405 438/27 |
| 2015/0335753 A1 * | 11/2015 | Desai | A61K 9/4866 424/490 |
| 2016/0272794 A1 | 9/2016 | Han et al. | |
| 2020/0031100 A1 | 1/2020 | Hayasaka et al. | |
| 2023/0086263 A1 * | 3/2023 | Taniyama | C08F 120/14 524/501 |

FOREIGN PATENT DOCUMENTS

| | | | |
|---|---|---|---|
| EP | 1205499 B1 * | 9/2009 | ............ C08F 220/44 |
| EP | 2343338 A1 * | 7/2011 | ............ C08K 3/346 |
| EP | 2463335 A1 | 6/2012 | |
| EP | 2671914 A1 | 12/2013 | |
| EP | 2746330 A1 | 6/2014 | |
| EP | 2869372 A1 | 5/2015 | |
| EP | 3124524 A1 | 2/2017 | |
| EP | 3124532 A1 | 2/2017 | |
| EP | 2343338 B1 * | 7/2018 | ............ C08K 3/346 |
| JP | 2009-179687 A | 8/2009 | |
| JP | 2009-235304 A | 10/2009 | |
| KR | 10-2013-0055334 A | 5/2013 | |
| WO | 2018/061868 A1 | 4/2018 | |
| WO | 2018/174068 A1 | 9/2018 | |

OTHER PUBLICATIONS

Feb. 10, 2020 Search Report issued in International Patent Application No. PCT/JP2019/046304.
May 25, 2021 International Preliminary Report on Patentability issued in International Patent Application No. PCT/JP2019/046304.
Jul. 25, 2022 Extended European Search Report issued in European Patent Application No. 19889280.4.
Aug. 4, 2025 Office Action issued in European Patent Application No. 19 889 280.4.

* cited by examiner

*Primary Examiner* — Mark S Kaucher
(74) *Attorney, Agent, or Firm* — Oliff PLC

(57) ABSTRACT

A latex composition for dip-molding obtained by mixing a latex of conjugated diene polymer (A) having a glass transition temperature of 10° C. or less and a latex of polymer (B) having a glass transition temperature above 10° C. A latex composition for dip-molding capable of providing a dip-molded article excellent in wear resistance, as well as wet grip when water and oil are deposited thereon can be provided.

17 Claims, 2 Drawing Sheets

LATEX COMPOSITION FOR DIP MOLDING AND DIP-MOLDED ARTICLE

TECHNICAL FIELD

The present invention relates to a latex composition for dip-molding. More particularly, the present invention relates to a latex composition for dip-molding capable of providing a dip-molded article excellent in wear resistance, as well as wet grip when water is deposited and when oil is deposited.

BACKGROUND ART

Conventionally, protective gloves whose solvent resistance, grip properties, wear resistance, and the like have been improved by coating fiber gloves with rubber, resin, or the like have been used in various applications, such as manufacturing work in factories, light work, construction work, agricultural work, and the like.

Such protective gloves are required to have excellent flexibility in addition to excellent mechanical strength such as wear resistance and durability as they are typically used in contact with a human body.

For example, Patent Document 1 discloses a method for producing a laminate comprising: a coagulant solution depositing step of depositing a coagulant solution on a fiber substrate; and a coagulating step of contacting the fiber substrate on which the coagulant solution is deposited to a polymer latex to coagulate a polymer, thereby forming a polymer layer on the fiber substrate, wherein as the coagulant solution, a solution obtained by dissolving or dispersing 0.2 to 7.0 wt % of a metal salt as a coagulant and 0.1 to 7.0 wt % of an organic acid in a solvent is used.

RELATED ART

Patent Document

PATENT DOCUMENT 1: WO 2018/061868

SUMMARY OF THE INVENTION

Problem to be Solved by the Invention

According to the technique disclosed in the above Patent Document 1, although a laminate excellent in flexibility and wear resistance and suitably used for protective glove applications can be obtained, there is room for improving grip performance when wet with water or oil (i.e., wet grip when water is deposited and when oil is deposited). Further improvement is required from the viewpoint of being suitably used even in applications in which the laminate is used while it is wetted with water or oil.

The present invention has been made in consideration of such circumstances. The present invention aims to provide a latex composition for dip-molding capable of providing a dip-molded article excellent in wear resistance, as well as wet grip when water is deposited and when oil is deposited thereon. In addition, the present invention aims to provide a dip-molded article excellent in wear resistance, as well as wet grip when water is deposited and when oil is deposited.

Means for Solving the Problem

The present inventors have intensively studied to solve the above problem. As a result, the present inventors have found that a dip-molded article obtained by dip-molding a latex composition obtained by mixing a latex of conjugated diene polymer (A) having a glass transition temperature of 10° C. or less and a latex of a polymer (B) having a glass transition temperature above 10° C. is excellent in wear resistance, as well as wet grip when water is deposited and when oil is deposited, thereby completing the present invention.

That is, according to the present invention, a latex composition for dip-molding obtained by mixing a latex of conjugated diene polymer (A) having a glass transition temperature of 10° C. or less and a latex of polymer (B) having a glass transition temperature above 10° C. is provided.

In the latex composition for dip-molding according to the present invention, it is preferable that the conjugated diene polymer (A) is a nitrile group-containing conjugated diene polymer.

In the latex composition for dip-molding according to the present invention, it is preferable that a content of the conjugated diene polymer (A) is 40 parts by weight or more based on 100 parts by weight of a polymer component.

In the latex composition for dip-molding according to the present invention, it is preferable that the glass transition temperature of the polymer (B) is 30° C. or more, and more preferably 50° C. or more.

In the latex composition for dip-molding according to the present invention, it is preferable that the polymer (B) contains a monomer unit having a halogen atom.

In the latex composition for dip-molding according to the present invention, it is preferable that the polymer (B) is vinyl chloride resin.

In the latex composition for dip-molding according to the present invention, it is preferable that the vinyl chloride resin does not contain a plasticizer.

In the latex composition for dip-molding according to the present invention, it is preferable that the vinyl chloride resin is a copolymer of vinyl chloride and a monomer copolymerizable with the vinyl chloride.

It is preferable that the latex composition for dip-molding according to the present invention further comprises a sulfur cross-linking agent.

In the latex composition for dip-molding according to the present invention, it is preferable that surface tension at 25° C. is 34 to 72 mN/m.

It is preferable that the latex composition for dip-molding according to the present invention further comprises a water-soluble polymer having an acid amount of 10 mmol/g or less.

Further, according of the present invention, a dip-molded article having a surface roughness of 20 μm or less, and a coefficient of dynamic friction of 0.10 or more on a surface on which a test oil IRM903 is deposited is provided.

Furthermore, according to the present invention, a dip-molded article comprising the above latex composition for dip-molding is provided.

In addition, according to the present invention, a dip-molded article obtained by immersing a substrate in the above latex composition for dip-molding is provided.

In the dip-molded article according to the present invention, it is preferable that a film thickness of a polymer layer comprising the latex composition for dip-molding is 0.05 to 1.0 mm.

Effects of Invention

According to the present invention, it is possible to provide a latex composition for dip-molding capable of providing a dip-molded article excellent in wear resistance, as well as wet grip when water is deposited and oil is deposited, and a dip-molded article excellent in wear resistance, as well as wet grip when water is deposited and oil is deposited.

DESCRIPTION OF EMBODIMENTS

<Latex Composition for Dip-Molding>

Figure 1:
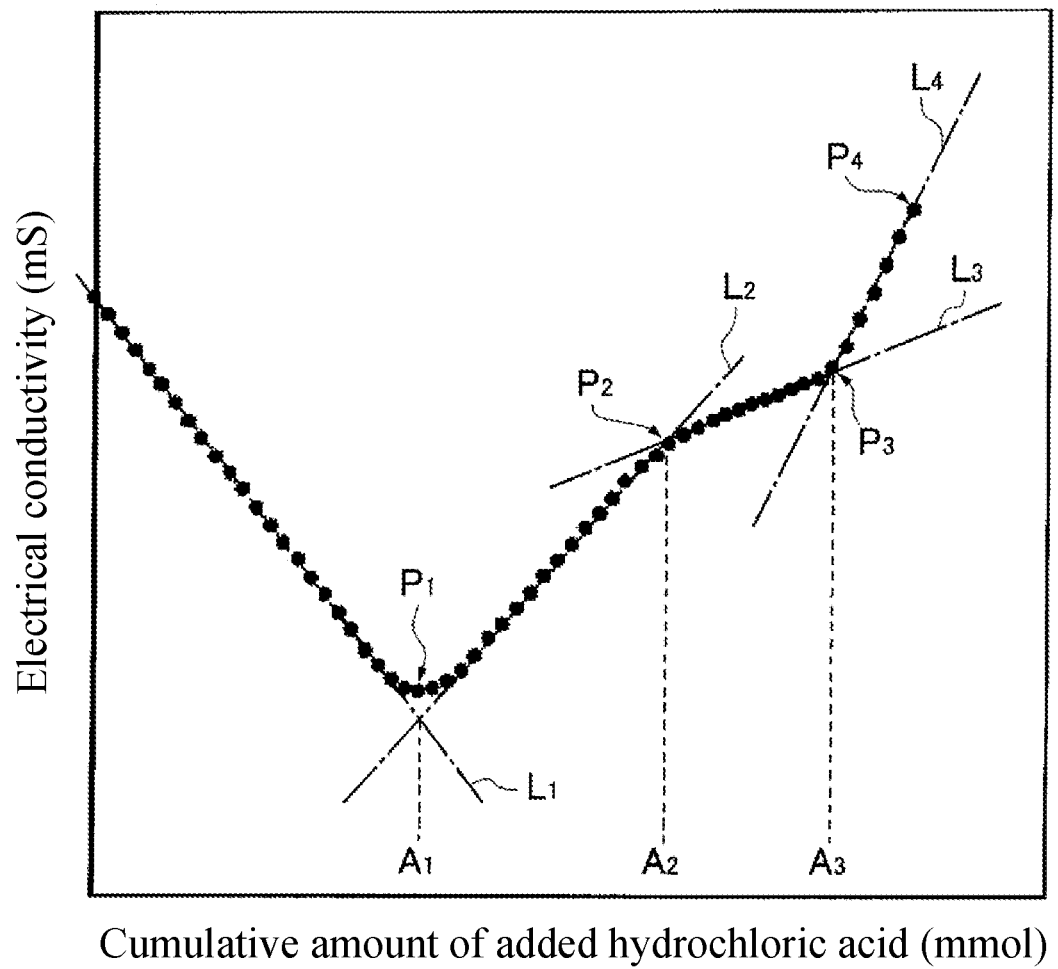
FIG. 1 is a diagram illustrating an example of a curve of amount of hydrochloric acid vs. electrical conductivity obtained when measuring an acid amount of a water-soluble polymer.
Figure 2:
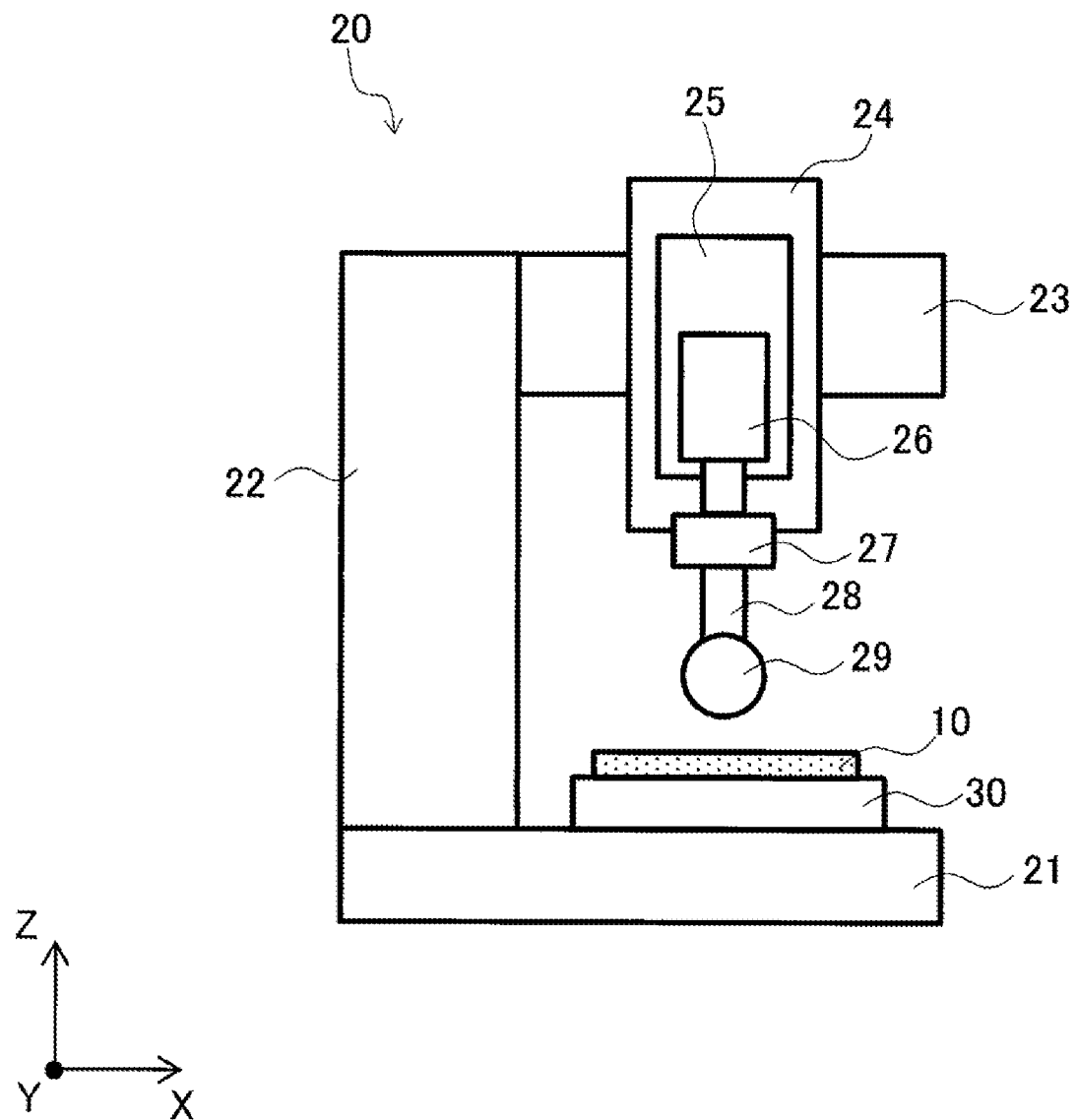
FIG. 2 is a diagram illustrating an indentation test equipment 20 used to measure flexibility in Examples.

The latex composition for dip-molding of the present invention is a latex composition for dip-molding obtained by mixing a latex of conjugated diene polymer (A) having a glass transition temperature of 10° C. or less and a latex of polymer (B) having a glass transition temperature above 10° C.

The conjugated diene polymer (A) having a glass transition temperature of 10° C. or less (hereinafter, as appropriate, referred to as "conjugated diene polymer (A)") constituting the latex of the conjugated diene polymer (A) having a glass transition temperature of 10° C. or less (hereinafter, as appropriate, referred to as "latex of conjugated diene polymer (A)") may be any polymer having a unit derived from a conjugated diene monomer, and is not particularly limited. Examples of the conjugated diene polymer (A) include nitrile rubber (NBR), natural rubber (NR), styrene-butadiene rubber (SBR), synthetic polyisoprene rubber (IR), polybutadiene rubber (BR), styrene-isoprene copolymer rubber, and styrene-isoprene-styrene copolymer rubber. Among these, from the viewpoint that effect of the present invention becomes more remarkable, synthetic rubber is preferable, and a conjugated diene polymer containing a nitrile group (hereinafter, as appropriate, referred to as "nitrile group-containing conjugated diene polymer") such as NBR is more preferable.

The nitrile group-containing conjugated diene polymer is not particularly limited, but a copolymer obtained by copolymerizing an α,β-ethylenically unsaturated nitrile monomer, and a conjugated diene monomer, as well as another copolymerizable ethylenically unsaturated acid monomer used if necessary, can be used.

The α,β-ethylenically unsaturated nitrile monomer is not particularly limited, and an ethylenically unsaturated compound having a nitrile group and preferably 3 to 18 carbon atoms can be used. Examples of such an α,β-ethylenically unsaturated nitrile monomer include acrylonitrile, methacrylonitrile, halogen-substituted acrylonitriles, and the like. Among these, acrylonitrile is particularly preferable. Note that, these α,β-ethylenically unsaturated nitrile monomers may be used alone or in combinations of two or more.

The content ratio of the α,β-ethylenically unsaturated nitrile monomer unit in the nitrile group-containing conjugated diene polymer is preferably 10 to 45 wt %, more preferably 20 to 40 wt %, still more preferably 25 to 40 wt % of the total monomer units. By adjusting the content ratio of the α,β-ethylenically unsaturated nitrile monomer unit within the range described above, the obtained dip-molded article can have excellent solvent resistance.

The conjugated diene monomer is preferably a conjugated diene monomer having 4 to 6 carbon atoms such as 1,3-butadiene, isoprene, 2,3-dimethyl-1,3-butadiene, 1,3-pentadiene, and chloroprene, more preferably 1,3-butadiene and isoprene, particularly preferably 1,3-butadiene. Note that these conjugated diene monomers may be used alone or in combinations of two or more.

The content ratio of the conjugated diene monomer unit in the nitrile group-containing conjugated diene polymer is preferably 40 to 80 wt %, more preferably 52 to 78 wt %, and still more preferably 55 to 75 wt % of the total monomer units. By adjusting the content ratio of the conjugated diene monomer unit within the range described above, the obtained dip-molded article can have improved flexibility.

Further, the nitrile group-containing conjugated diene polymer may be a copolymer famed by copolymerizing a monomer forming an α,β-ethylenically unsaturated nitrile monomer unit and a monomer forming the conjugated diene monomer unit with an additional copolymerizable ethylenically unsaturated acid monomer.

The additional copolymerizable ethylenically unsaturated acid monomer is not particularly limited, and examples thereof include carboxyl group-containing ethylenically unsaturated monomers, sulfonic acid group-containing ethylenically unsaturated monomers, phosphoric acid group-containing ethylenically unsaturated monomers, and the like.

The carboxyl group-containing ethylenically unsaturated monomer is not particularly limited, and examples thereof include ethylenically unsaturated monocarboxylic acids such as acrylic acid, methacrylic acid, and crotonic acid; ethylenically unsaturated polyvalent carboxylic acids and anhydrides thereof, such as fumaric acid, maleic acid, itaconic acid, maleic anhydride, itaconic anhydride; partially esterified products of ethylenically unsaturated polyvalent carboxylic acids, such as methyl maleate and methyl itaconate; and the like.

The sulfonic acid group-containing ethylenically unsaturated monomer is not particularly limited, and examples thereof include vinylsulfonic acid, methylvinylsulfonic acid, styrenesulfonic acid, (meth)allylsulfonic acid, ethyl (meth)acrylate-2-sulfonate, 2-acrylamide-2-hydroxypropanesulfonic acid, and the like.

The phosphoric acid group-containing ethylenically unsaturated monomer is not particularly limited, and examples thereof include propyl (meth)acrylate-3-chloro-2-phosphate, ethyl (meth)acrylate-2-phosphate, 3-allyloxy-2-hydroxypropane phosphoric acid, and the like.

These additional copolymerizable ethylenically unsaturated acid monomers may be used as alkali metal salts or ammonium salts, and may be used alone or in combinations of two or more. Among the additional copolymerizable ethylenically unsaturated acid monomers mentioned above, a carboxyl group-containing ethylenically unsaturated monomer is preferable, an ethylenically unsaturated monocarboxylic acid is more preferable, acrylic acid and methacrylic acid are still more preferable, and methacrylic acid is particularly preferable.

When the nitrile group-containing conjugated diene polymer contains a unit of another copolymerizable ethylenically unsaturated acid monomer, a content ratio of the unit of another copolymerizable ethylenically unsaturated acid monomer is preferably 0.1 to 15 wt %, more preferably 1 to 10 wt %, and still more preferably 2 to 8 wt %, based on total monomer units.

The latex of the nitrile group-containing conjugated diene polymer can be obtained, for example, by emulsion polymerization of a monomer mixture containing the above monomers. In the emulsion polymerization, ordinarily used polymerization additives, such as an emulsifier, a polymerization initiator, a molecular weight adjuster, and the like can be used.

The emulsifier used for the emulsion polymerization is not particularly limited, and examples thereof include an anionic surfactant, a nonionic surfactant, a cationic surfactant, an ampholytic surfactant, and the like, and an anionic surfactant is preferable. Specific examples of the anionic surfactant include fatty acid salts such as sodium laurate, potassium myristate, sodium palmitate, potassium oleate, sodium linolenate, and sodium rosinate; alkylbenzene sulfonates such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkyl sulfosuccinates such as sodium di(2-ethylhexyl)sulfosuccinate, potassium di(2-ethylhexyl)sulfosuccinate, sodium dioctylsulfosuccinate; alkyl sulfate ester salts such as sodium lauryl sulfate, potassium lauryl sulfate; polyoxyethylene alkyl ether sulfate salts such as sodium polyoxyethylene lauryl ether sulfate and potassium polyoxyethylene lauryl ether sulfate; monoalkyl phosphates such as sodium lauryl phosphate, potassium lauryl phosphate; and the like.

The amount of the emulsifier to be used in the emulsion polymerization is preferably 0.5 to 10 parts by weight, more preferably 1 to 8 parts by weight based on 100 parts by weight of the total monomers to be used.

The polymerization initiator is not particularly limited, but a radical initiator is preferable. The radical initiator is not particularly limited, and examples thereof include inorganic peroxides such as sodium persulfate, potassium persulfate, ammonium persulfate, potassium peiphosphate, and hydrogen peroxide; organic peroxides such as t-butyl peroxide, cumene hydroperoxide, p-menthane hydroperoxide, di-t-butyl peroxide, t-butyl cumyl peroxide, acetyl peroxide, isobutyryl peroxide, octanoyl peroxide, dibenzoyl peroxide, 3,5,5-trimethylhexanoyl peroxide, and t-butylperoxy isobutyrate; azo compounds such as azobisisobutyronitrile, azobis-2,4-dimethylvaleronitrile, azobiscyclohexanecarbonitrile, and methyl azobisisobutyrate; and the like. Among these, an inorganic peroxide or an organic peroxide is preferable, an inorganic peroxide is more preferable, and a persulfate is particularly preferable. These polymerization initiators may be used alone or in combinations of two or more.

The amount of the polymerization initiator to be used is preferably 0.01 to 2 parts by weight, more preferably 0.05 to 1.5 parts by weight based on 100 parts by weight of the total monomers to be used.

The molecular weight adjuster is not particularly limited, and examples thereof include α-methyl styrene dimer; mercaptans such as t-dodecyl mercaptan, n-dodecyl mercaptan, and octyl mercaptan; halogenated hydrocarbons such as carbon tetrachloride, methylene chloride, and methylene bromide; sulfur-containing compounds such as tetraethylthiuram disulfide, dipentamethylenethiuram disulfide, and diisopropyl xanthogen disulfide, and the like. Among these, mercaptans are preferable, and t-dodecylmercaptan is more preferable. These molecular weight adjusters may be used alone or in combinations of two or more.

Although the amount of the molecular weight adjuster to be used depends on its type, it is preferably 0.1 to 1.5 parts by weight, more preferably 0.2 to 1.0 parts by weight based on 100 parts by weight of the total monomers to be used.

Emulsion polymerization is usually carried out in water. The amount of the water to be used is preferably 80 to 500 parts by weight, more preferably 100 to 200 parts by weight based on 100 parts by weight of the total monomers to be used.

In the emulsion polymerization, optionally, a polymerization additive other than the above may be further used. Examples of the polymerization additive include chelating agents, dispersants, pH regulators, deoxidizing agents, particle size adjusting agents, and the like. The type and amount to be used of those polymerization additives are not particularly limited.

Examples of the method for adding the monomers include a method for adding the monomers used in the reaction vessel at a time, a method for continuously or intermittently adding the monomers according to the progress of polymerization, a method in which the reaction is carried out up to a specific conversion ratio by adding a part of the monomers and then the remaining monomers are continuously or intermittently added and polymerized, and the like. Any of these methods may be employed. In the case of mixing and adding the monomers continuously or intermittently, the composition of the mixture may be constant or may be changed.

Further, the monomer to be used may be mixed and then added to the reaction vessel, or each monomer may be individually added to the reaction vessel.

A polymerization temperature during emulsion polymerization is not particularly limited, but is usually 0 to 95° C., preferably 5 to 70° C. Polymerization time is not particularly limited, but is usually about 5 to 40 hours.

After stopping the polymerization reaction, if desired, unreacted monomers may be removed, and the solids content and pH may be adjusted.

The glass transition temperature of the conjugated diene polymer (A) constituting the latex of conjugated diene polymer (A) is 10° C. or less, preferably −45 to −10° C., more preferably −40 to −10° C. When the glass transition temperature of the conjugated diene polymer (A) is too high, the obtained dip-molded article will be inferior in the wet grip when water is deposited and when oil is deposited. A method for adjusting the glass transition temperature of the conjugated diene polymer (A) within the above range is not particularly limited, and examples thereof include a method for adjusting the content ratio of the unit of each monomer constituting the conjugated diene polymer (A) within the above range.

Further, a weight average particle size of particles of the conjugated diene polymer (A) constituting the latex of conjugated diene polymer (A) is preferably 30 to 1000 nm, more preferably 50 to 500 nm, and still more preferably 70 to 200 nm. By adjusting the weight average particle size of the particles of the conjugated diene polymer (A) within the above range, in the obtained dip-molded article, the polymer (B) having a glass transition temperature above 10° C. can be preferably finely dispersed in the conjugated diene polymer (A), thereby further enhancing the wear resistance.

In addition, from the viewpoint of adjusting surface tension as a latex composition for dip-molding to a preferable range to be described later, surface tension of the latex of conjugated diene polymer (A) at 25° C. is preferably 28 to 72 mN/m, more preferably 29 to 65 mN/m, and still more preferably 30 to 60 mN/m. The surface tension of the latex of conjugated diene polymer (A) can be adjusted by a method for adjusting an amount of an emulsifier used for emulsion polymerization, a method for adjusting the weight average particle size of the particles of the conjugated diene polymer (A) constituting the latex of conjugated diene polymer (A), and the like.

The polymer (B) having a glass transition temperature above 10° C. (hereinafter, as appropriate, referred to as "polymer (B)") constituting a latex of the polymer (B) having a glass transition temperature above 10° C. (hereinafter, as appropriate, referred to as "latex of polymer (B)") is not particularly limited, and any polymer having a glass transition temperature above 10° C. may be used. From the viewpoint of obtaining a dip-molded article excellent in flexibility, wear resistance, and wet grip when water is deposited and when oil is deposited, however, a polymer containing a monomer unit having a halogen atom is preferable.

The halogen atom is not particularly limited, and for example, a fluorine atom, a chlorine atom, a bromine atom, and an iodine atom are preferable, and a chlorine atom is more preferable from the viewpoint of resistance to permeation of chemicals and oil resistance in continuous use of the obtained dip-molded article. In other words, as the polymer (B), a polymer containing a monomer unit having a chlorine atom is more preferable.

The monomer having a halogen atom forming the monomer unit having a halogen atom is not particularly limited, and examples thereof include unsaturated alkyl halides, unsaturated alcohol esters of halogen-containing saturated carboxylic acids, (meth)acrylic acid haloalkyl esters, (meth)acrylic acid haloacyloxyalkyl esters, (meth)acrylic acid (haloacetylcarbamoyloxy)alkyl esters, halogen-containing unsaturated ethers, halogen-containing unsaturated ketones, halomethyl group-containing aromatic vinyl compounds, halogen-containing unsaturated amides, haloacetyl group-containing unsaturated monomers, and the like. Among these, from the viewpoint of obtaining a dip-molded article excellent in flexibility, wear resistance, and wet grip when water is deposited and when oil is deposited, unsaturated alkyl halides are preferably used, vinyl chloride is more preferably used, and vinyl chloride resin having a vinyl chloride unit as a main component is still more preferably used as the polymer (B).

As the vinyl chloride resin as the polymer (B), any of a homopolymer of vinyl chloride and a copolymer of vinyl chloride and a monomer copolymerizable with vinyl chloride may be used. When the vinyl chloride resin is a copolymer, a content of a vinyl chloride monomer unit in the vinyl chloride resin is preferably 50 wt % or more, more preferably 75 wt % or more, and still more preferably 90 wt % or more.

Examples of the monomer copolymerizable with vinyl chloride include α-olefin monomers such as ethylene, propylene, 1-butene, 4-methyl-1-pentene, 1-hexene, 1-octene; aromatic monomers such as styrene, α-methylstyrene, vinylpyridine; α,β-ethylenically unsaturated monocarboxylic acids such as acrylic acid, methacrylic acid, crotonic acid, and cinnamic acid; esters of α,β-ethylenically unsaturated monocarboxylic acids such as ethyl (meth)acrylate, butyl (meth)acrylate, and 2-ethylhexyl (meth)acrylate; α,β-ethylenically unsaturated polycarboxylic acids such as maleic acid, fumaric acid, and itaconic acid; α,β-ethylenically unsaturated polycarboxylic acid monoesters such as monomethyl maleate, monoethyl maleate, monoethyl itaconate; α,β-ethylenically unsaturated polycarboxylic acid polyvalent esters such as dimethyl maleate, di-n-butyl fumarate, dimethyl itaconate, and di-2-ethylhexyl itaconate; vinyl ester monomers such as vinyl acetate and vinyl propionate; α,β-ethylenically unsaturated monocarboxylic acid amides such as acrylamide and methacrylamide; N-substituted maleimides; vinyl ether monomers such as vinyl methyl ether, vinyl ethyl ether, and vinyl cetyl ether; vinylidene compounds such as vinylidene chloride; and the like. Among these, vinyl ester monomers and esters of α,β-ethylenically unsaturated monocarboxylic acids are preferable, and vinyl acetate and a (meth)acrylic acid ester are more preferable. In other words, the vinyl chloride resin as the polymer (B) is preferably a copolymer of vinyl chloride and vinyl acetate, and a copolymer of vinyl chloride and a (meth)acrylic acid ester.

The method for producing a latex of a vinyl chloride resin as the polymer (B) may be any method capable of polymerizing the above monomer, and is not particularly limited, and examples thereof include methods of publicly known emulsion polymerization, seed emulsion polymerization, and fine suspension polymerization with radical polymerization.

A K-value of the vinyl chloride resin as the polymer (B) measured according to JIS K 7367-2 is preferably 50 to 95, and more preferably 60 to 80.

The vinyl chloride resin as the polymer (B) preferably contains a plasticizer in an amount of 20 parts by weight or less based on 100 parts by weight of the polymer (B), and more preferably contains no plasticizer. As a result, the wet grip of the obtained dip-molded article when water is deposited and when oil is deposited can be further increased. In this case, the tam. "contains no plasticizer" means any embodiment such that a plasticizer is substantially not contained in the particle of the vinyl chloride resin constituting the latex of vinyl chloride resin, and for example, an embodiment in which a content of the plasticizer is suppressed to 10 ppm by weight or less.

As the polymer (B), in addition to the vinyl chloride resin, for example, polystyrene resin, polymethyl methacrylate resin, PTEE, resin, acrylic resin, and the like may be used. As the polymer (B), vinyl chloride resin or polystyrene resin is preferable, and vinyl chloride resin is more preferable from the viewpoint of the resistance to permeation of chemicals and the oil resistance in continuous use of the obtained dip-molded article. These polymers may be used alone or in combinations of two or more.

The glass transition temperature of the polymer (B) constituting the latex of polymer (B) is above 10° C., preferably 30° C. or more, more preferably to 50° C. or more, and still more preferably 70° C. or more. Further, an upper limit of the glass transition temperature of the polymer (B) is not particularly limited, but is preferably 200° C. or less, and more preferably 150° C. or less. The present invention provides the latex composition for dip-molding obtained by mixing the latex of conjugated diene polymer (A) having a glass transition temperature of 10° C. or less and the latex of polymer (B) having a glass transition temperature above 10° C. in a state of latex. According to the present invention, by mixing the latex of conjugated diene polymer (A) and the latex of polymer (B) in the state of latex, a dip-molded article obtained with such a latex composition can be excellent in the flexibility and the wear resistance, as well as the wet grip when water is deposited and when oil is deposited.

In particular, according to the present invention, by mixing the latex of conjugated diene polymer (A) and the latex of polymer (B) in the state of latex, the particle of the conjugated diene polymer (A) and the particle of the polymer (B) can be uniformly and finely disperse in the latex composition. As a result, when a dip-molded article is obtained by dip-molding, in the obtained dip-molded article, the conjugated diene polymer (A) and the polymer (B) can be co-precipitated in the state where the polymer (B) is finely dispersed in the matrix of the conjugated diene polymer (A). Thus, while realizing excellent wear resistance that the conjugated diene polymer (A) has, by action of the finely dispersed polymer (B), high flexibility and excellent wet grip when water is deposited and when oil is deposited can be provided. Note that, in the present invention, although the latex of conjugated diene polymer (A) and the latex of polymer (B) are mixed in the state of latex to form the latex composition, the latex composition for dip-molding of the present invention is not particularly limited to those obtained by mixing these latexes, and may be any one in which the particle of the conjugated diene polymer (A) and the particle of the polymer (B) are dispersed in an aqueous medium.

When the glass transition temperature of the polymer (B) constituting the latex of polymer (B) is too low, the obtained dip-molded article will be inferior in the wet grip when water is deposited and when oil is deposited. The method for adjusting the glass transition temperature of the polymer (B) within the above range is not particularly limited, and examples thereof include a method for adjusting a content of the vinyl chloride monomer unit to preferably 50 wt % or more, more preferably 75 wt % or more, based on the vinyl chloride resin, when a latex of vinyl chloride resin is used as the latex of polymer (B).

The weight average particle size of the particle of the polymer (B) constituting the latex of polymer (B) is preferably 0.05 to 500 µm, more preferably 0.1 to 500 µm, still more preferably 0.1 to 60 µm, still further more preferably 0.1 to 50 µm, and particularly preferably 0.1 µm or more, and less than 3 µm. By adjusting the weight average particle size of the particles of the polymer (B) within the above range, in the obtained dip-molded article, the polymer (B) can be preferably finely dispersed in the conjugated diene polymer (A), thereby further enhancing the wear resistance.

In addition, from the viewpoint of adjusting surface tension as a latex composition for dip-molding to a preferable range to be described later, surface tension of the latex of polymer (B) at 25° C. is preferably 34 to 72 mN/m, more preferably 35 to 65 mN/m, and still more preferably 36 to 60 mN/m. The surface tension of the latex of polymer (B) can be adjusted by a method for adjusting an amount of an emulsifier used for emulsion polymerization, a method for adjusting the weight average particle size of the particles of the polymer (B) constituting the latex of polymer (B), and the like.

The contents of the conjugated diene polymer (A) and the polymer (B) in the latex composition for dip-molding of the present invention are not particularly limited, but based on 100 parts by weight of the polymer component contained in the latex composition for dip-molding (when it contains only the conjugated diene polymer (A) and the polymer (B) as polymer components, total of the conjugated diene polymer (A) and the polymer (B) becomes 100 parts by weight), the content of the conjugated diene polymer (A) is preferably 40 parts by weight or more, more preferably 40 to 95 parts by weight, and still more preferably 40 to 80 parts by weight. Further, based on 100 parts by weight of the polymer component contained in the latex composition for dip-molding, the content of the polymer (B) is preferably 5 to 80 parts by weight, more preferably 10 to 70 parts by weight, and still more preferably 20 to 60 parts by weight. Further, a content ratio of the conjugated diene polymer (A) and the polymer (B) in the latex composition for dip-molding of the present invention is preferably 99:1 to 10:90, more preferably 95:5 to 20:80, still more preferably 90:10 to 30:70, and particularly preferably 75:25 to 45:55, in terms of a weight ratio of "conjugated diene polymer (A):polymer (B)". By adjusting the content of the conjugated diene polymer (A) and the polymer (B) within the above range, the wear resistance and the wet grip when water is deposited and when oil is deposited of the obtained dip-molded article can be further increased.

Further, it is preferable that the latex composition for dip-molding of the present invention further comprises a sulfur cross-linking agent in addition to the latex of conjugated diene polymer (A) and the latex of polymer (B).

The sulfur cross-linking agent is not particularly limited, and examples thereof include sulfur such as powdered sulfur, sublimed sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzo thiazyl disulfide, caprolactam disulfide, phosphorus-containing polysulfide, and polysulfide polymers; sulfur donating compounds such as tetramethyl thiuram disulfide, selenium dimethyl dithiocarbamate, and 2-(4'-morpholinodithio)benzothiazole; and the like. These sulfur cross-linking agents may be used alone or in combinations of two or more.

The content of the sulfur cross-linking agent is preferably 0.01 to 5 parts by weight, more preferably 0.05 to 3 parts by weight, still more preferably 0.1 to 2 parts by weight based on 100 parts by weight of the polymer content contained in the latex composition for dip-molding.

It is preferable that the latex composition for dip-molding of the present invention further comprises a cross-linking accelerator (vulcanization accelerator) and zinc oxide in addition to the sulfur cross-linking agent.

The cross-linking accelerator (vulcanization accelerator) is not particularly limited, and examples thereof include dithiocarbamic acids and zinc salts thereof, such as diethyl dithiocarbamic acid, dibutyl dithiocarbamic acid, di-2-ethylhexyl dithiocarbamic acid, dicyclohexyl dithiocarbamic acid, diphenyl dithiocarbamic acid, and dibenzyl dithiocarbamic acid; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthiocarbamoylthio)benzothiazole, 2-(2,6-dimethyl-4-morpholinothio)benzothiazole, 2-(4'-morpholino-dithio)benzothiazole, 4-morpholinyl-2-benzothiazyl disulfide, 1,3-bis(2-benzothiazyl-mercaptomethyl) urea, and the like. Among these, zinc diethyl dithiocarbamate, zinc dibutyl dithiocarbamate, 2-mercaptobenzothiazole, and zinc 2-mercaptobenzothiazole are preferable. These cross-linking accelerators may be used alone or in combinations of two or more.

A content of the cross-linking accelerator is preferably 0.1 to 10 parts by weight, more preferably 0.5 to 5 parts by weight, based on 100 parts by weight of the polymer component contained in the latex composition for dip-molding. Further, a content of the zinc oxide is preferably 0.1 to 10 parts by weight, more preferably 0.5 to 5 parts by weight, based on 100 parts by weight of the polymer component contained in the latex composition for dip-molding.

In addition, the latex composition for dip-molding of the present invention may further comprise a water-soluble polymer.

Examples of the water-soluble polymer include thickening agents, for example, vinyl compounds such as polyvinyl alcohol and polyvinylpyrrolidone; cellulose derivatives such as hydroxyethyl cellulose, hydroxypropyl cellulose, carboxymethyl cellulose and salts thereof; polycarboxylic acid compounds such as polyacrylic acid and sodium salts thereof; polyoxyethylene derivatives such as polyethylene glycol ether; and the like. As the thickening agent, cellulose derivatives and salts thereof are preferable, and carboxymethyl cellulose and a sodium salt thereof are more preferable. A content of the thickening agent is preferably 0.01 to 10 parts by weight, more preferably 0.1 to 5 parts by weight, based on 100 parts by weight of the polymer component contained in the latex composition for dip-molding.

An acid amount of the water-soluble polymer is not particularly limited, but is preferably 10 mmol/g or less. In other words, it is preferable that the latex composition for dip-molding of the present invention comprises a water-soluble polymer having an acid amount of 10 mmol/g or less.

From the viewpoint of further enhancing barrier performance against chemicals such as a solvent and oil, the resistance to permeation of chemicals may be required for a dip-molded article such as a protective glove. When the latex composition for dip-molding of the present invention comprises a water-soluble polymer having an acid amount of 10 mmol/g or less in addition to the latex of conjugated diene polymer (A) and the latex of polymer (B), the obtained dip-molded article can be excellent in the resistance to permeation of chemicals, in addition to the wear resistance, and the wet grip when water is deposited and when oil is deposited.

The acid amount of the water-soluble polymer is preferably 10 mmol/g or less, more preferably 5 mmol/g or less, and still more preferably 2.5 mmol/g or less. A lower limit of the acid amount of the water-soluble polymer is not particularly limited, but is usually 0.001 mmol/g or more. By adjusting the acid amount of the water-soluble polymer within the above range, the obtained dip-molded article becomes excellent in the resistance to permeation of chemicals.

The water-soluble polymer having an acid amount of 10 mmol/g or less is not particularly limited, and examples thereof include vinyl compounds such as polyvinyl alcohol and polyvinylpyrrolidone; carboxylic acid-modified vinyl compounds such as carboxylic acid-modified polyvinyl alcohol and carboxylic acid-modified polyvinylpyrrolidone; cellulose derivatives such as hydroxyethylcellulose, hydroxypropylcellulose, carboxymethylcellulose and salts thereof; polyoxyethylene derivatives such as polyethylene glycol ether; and the like. Among these, from the viewpoint of the resistance to permeation of chemicals, vinyl compounds and carboxylic acid-modified compounds thereof or polyoxyethylene derivatives are preferable, and vinyl compounds and carboxylic acid-modified compounds thereof are more preferable. These water-soluble polymers may be used alone or in combinations of two or more.

The acid amount of the water-soluble polymer can be measured, for example, according to the following method.

First, 50 g of an aqueous solution of a water-soluble polymer in which solid content concentration is adjusted to 0.2 to 1% by adding distilled water (a solid content of the water-soluble polymer in 50 g of the aqueous solution of the water-soluble polymer is defined as W (g)) is charged into a 200 ml glass vessel that is washed with distilled water. The glass vessel is set in a solution conductivity meter (manufactured by Kyoto Electronics Manufacturing Co., Ltd.: CM-117, used cell type: K-121) to start stirring. Next, in a state of continuing the stirring, 0.1N sodium hydroxide is added so that a pH of the aqueous solution becomes 12 or more, and an electrical conductivity is measured after 6 minutes, and the obtained measured value is defined as the electrical conductivity at the start of measurement. Then, 0.5 ml of 0.1N hydrochloric acid is added to the aqueous solution of the water-soluble polymer, and the electrical conductivity is measured after 30 seconds. An operation of adding 0.5 ml of 0.1N hydrochloric acid again and measuring the electrical conductivity after 30 seconds of the addition is performed repeatedly every 30 seconds until the measured electrical conductivity becomes equal to or higher than the electrical conductivity at the start of measurement. The obtained electrical conductivity data are plotted on a graph with the vertical axis of electrical conductivity (mS) and the horizontal axis of cumulative amount of added hydrochloric acid (mmol) to obtain a curve of the amount of hydrochloric acid vs. the electrical conductivity having three inflection points as shown in FIG. 1. X-coordinates of the obtained three inflection points and X-coordinate at the end of the addition of hydrochloric acid are defined as, from the smallest to the largest, $P_1$, $P_2$, $P_3$ and $P_4$, respectively. Approximate straight lines $L_1$, $L_2$, $L_3$ and $L_4$ are obtained by the least squares method respectively for the data in four sections, from 0 to $P_1$, from $P_1$ to $P_2$, from $P_2$ to $P_3$, and from $P_3$ to $P_4$, in the X-coordinates. In addition, X-coordinate of the intersection of $L_1$ and $L_2$ is set to $A_1$ (mmol), X-coordinate of the intersection of $L_2$ and $L_3$ is set to $A_2$ (mmol), and X-coordinate of the intersection of $L_3$ and $L_4$ is set to $A_3$ (mmol). Then, an acid amount per 1 g of the water-soluble polymer is determined according to the following equation.

Acid amount per 1 g of water-soluble polymer=$(A_2-A_1)/W$ (mmol/g)

When two or more of water-soluble polymers are used in combination, an acid amount of a mixture of the water-soluble polymers, which is obtained by mixing each water-soluble polymer in the same ratio as the ratio of each water-soluble polymer that exists in the latex composition for dip-molding, obtained by measuring the acid amount of the mixture of the water-soluble polymers in the same manner as described above can be defined as the acid amount of the water-soluble polymer.

When the water-soluble polymer is used as an aqueous solution with 4 wt %, viscosity of the aqueous solution is not particularly limited, but is preferably 1 mPa·s or more, more preferably 10 mPa·s or more, and is preferably 20,000 mPa·s or less, more preferably 10,000 mPa·s or less. When the water-soluble polymer is used as an aqueous solution with 1 wt %, viscosity of the aqueous solution is not particularly limited, but is preferably 1 mPa·s or more, more preferably 10 mPa·s or more, and is preferably 20,000 mPa·s or less, more preferably 10,000 mPa·s or less. The viscosity of the aqueous solution of the water-soluble polymer can be measured, for example, by using a B-type viscometer at 25° C. under the condition of a rotational speed of 6 rpm.

The water-soluble polymer may be any polymer that can be dissolved in water, and solubility of the water-soluble polymer in water is not particularly limited, but is preferably 1 g or more, more preferably 7 g or more, and particularly preferably 10 g or more, per 100 g of water at a temperature of 25° C. An upper limit of the solubility of the water-soluble polymer in water is not particularly limited, but is usually 1,000,000 g or less.

The weight average molecular weight (Mw) of the water-soluble polymer is not particularly limited, but is preferably 100 or more, more preferably 1,000 or more, and is preferably 5,000,000 or less, more preferably 3,000,000 or less.

An amount of the water-soluble polymer to be blended is preferably 0.01 to 10 parts by weight, more preferably 0.1 to 5 parts by weight, and still more preferably from 0.15 to 4.5 parts by weight, based on 100 parts by weight of the polymer component contained in the latex composition for dip-molding. By adjusting the amount of the water-soluble polymer to be blended within the above range, the obtained dip-molded article becomes excellent in the resistance to permeation of chemicals.

Solid content concentration of the latex composition for dip-molding of the present invention is preferably 20 to 65 wt %, more preferably 30 to 60 wt %, and still more preferably 35 to 55 wt %. By adjusting the solid content concentration of the latex composition for dip-molding within the above range, transport efficiency of the latex composition for dip-molding can be improved, and the viscosity of the latex composition for dip-molding becomes appropriate to improve handleability of the latex composition for dip-molding.

A pH of the latex composition for dip-molding of the present invention is preferably 5 to 13, more preferably 7 to 10, and still more preferably 7.5 to 9. By adjusting the pH of the latex composition for dip-molding within the above range, mechanical stability is improved, so that generation of coarse aggregates when transporting the latex composition for dip-molding can be prevented, and the viscosity of the latex composition for dip-molding becomes appropriate to improve the handleability of the latex composition for dip-molding.

The viscosity of the latex composition for dip-molding of the present invention is preferably 2,000 to 100,000 mPa·s, more preferably 2,500 to 50,000 mPa·s, and still more preferably 3,000 to 20,000 mPa·s at 25° C. The viscosity of the latex composition for dip-molding at 25° C. can be measured, for example, by using a B-type viscometer at 25° C. under the condition of a rotational speed of 6 rpm. The viscosity of the latex composition for dip-molding at 25° C. can be adjusted, for example, by a method for adjusting concentration of a polymer component in the latex composition for dip-molding, a method for adding a compound having a thickening action to the latex composition for dip-molding, and the like.

Surface tension of the latex composition for dip-molding of the present invention is preferably 34 to 72 mN/m, more preferably 35 to 65 mN/m, and still more preferably 36 to 60 mN/m at 25° C. By adjusting the surface tension of the latex composition for dip-molding within the above range, the wet grip of the obtained dip-molded article when water is deposited and when oil is deposited can be further increased. The surface tension of the latex composition for dip-molding can be adjusted, for example, by a method for adjusting surface tension of the latex of conjugated diene polymer (A) or the latex of polymer (B) within the above range, a method for adjusting surface tension of the latex of polymer (B) constituting the latex of polymer (B) within the above range, and the like.

Fillers such as carbon black, silica, calcium carbonate, aluminum silicate, magnesium silicate, calcium silicate, magnesium oxide, zinc (meth)acrylate, magnesium (meth) acrylate, and titanium oxide may be added to the latex composition for dip-molding of the present invention. Further, in addition to the above water-soluble salts and fillers, various additives such as an anti-aging agent, an antioxidant, a preservative, an antimicrobial agent, a wetting agent, a dispersant, a pigment, a dye, a reinforcing agent, a pH-adjusting agent, and the like may be added to the latex composition for dip-molding of the present invention in a predetermined amount, as required.

The latex composition of the present invention can be prepared, for example, by mixing the components mentioned above. Although mixing order of each component is not particularly limited, from the viewpoint of further enhancing dispersibility of each component, a method for mixing the latex of conjugated diene polymer (A) and the latex of polymer (B) in advance, and adding and mixing each component to be blended if necessary is preferable. A method for mixing the latex of conjugated diene polymer (A) and the latex of polymer (B) is not particularly limited, but from the viewpoint of further enhancing dispersibility, a method for mixing the latex of conjugated diene polymer (A) and the latex of polymer (B) in a state of latex (latex blend) is preferable.

<Dip-Molded Article>

The dip-molded article of the present invention has a surface roughness of 20 μm or less and a coefficient of dynamic friction of 0.10 or more on a surface on which test oil IRM903 is deposited. The dip-molded article of the present invention has an enhanced coefficient of dynamic friction on a surface on which test oil IRM903 is deposited, while the surface roughness of the surface is kept sufficiently low, thereby providing excellent wear resistance and excellent wet grip when water is deposited and when oil is deposited.

The surface roughness of the surface of the dip-molded article of the present invention is not particularly limited as long as it is 20 μm or less, but is preferably 18 μm or less. By adjusting the surface roughness of the surface of the dip-molded article within the above range, the dip-molded article becomes excellent in wear resistance and generation of powder fall can be prevented. A lower limit of the surface roughness of the surface is not particularly limited, but is preferably 0.1 μm or more, more preferably 1.5 μm or more, from the viewpoint of the wet grip when water is deposited and when oil is deposited. Line roughness of the surface of the dip-molded article of the present invention is preferably 15 μm or less, more preferably 12 μm or less. A lower limit of the line roughness of the surface is not particularly limited, but is preferably 0.1 μm or more, more preferably 0.9 μm or more, and particularly preferably 3.0 μm or more. Although a method for adjusting the surface roughness and line roughness of the surface of the dip-molded article within the above range is not particularly limited, a method for obtaining a dip-molded article using the above latex composition for dip-molding of the present invention is preferable.

In general, to improve the wet grip of the dip-molded article, a method for increasing the surface roughness and line roughness of the surface is applied, including a method for dip-molding using a foamed latex composition for dip-molding, a method for performing surface treatment after obtaining a dip-molded article, and the like. On the other hand, a dip-molded article obtained by these methods tends to be inferior in the wear resistance since the surface roughness and line roughness of the surface are too large, and powder fall tends to occur. In addition, since these methods require a foaming step and a surface treatment step, there has been a problem that production efficiency is lowered. Moreover, in the method for performing the surface treatment after obtaining the dip-molded article, there has been a problem that contamination due to the surface treatment is likely to occur.

On the other hand, according to the method for producing the dip-molded article using the latex composition for dip-molding of the present invention described above, adjusting the coefficient of dynamic friction within the above range when the IRM903 is deposited becomes easy, while controlling the surface roughness of the surface of the obtained dip-molded article to be within the above range. As a result, a dip-molded article having the excellent wear resistance and the excellent wet grip when water is deposited and when oil is deposited, and in which the generation of powder fall is prevented, can be readily obtained.

The surface roughness and line roughness on the surface of the dip-molded article can be measured, for example, using a laser microscope (manufactured by KEYENCE CORPORATION, VK-X100), by the following measurement conditions.

Measurement Conditions>
  Measurement mode: surface shape
  Measurement quality: high definition
  Objective lens: CF Plan 100×/0.95 ∞/0 EPI
  Measurement area: 960 μm×520 μm
  Z-direction measurement pitch: 0.12 μm
  Arithmetic mean roughness of height data obtained by the measurement is calculated by analysis software ("surface roughness" measurement function of VK shape analysis application VK-H1XJ manufactured by KEYENCE CORPORATION).

Further, the dip-molded article of the present invention has a coefficient of dynamic friction of 0.10 or more on a surface on which test oil IRM903 is deposited (hereinafter referred to as "coefficient of dynamic friction when IRM903 is deposited" as appropriate). The coefficient of dynamic friction when IRM903 is deposited of the dip-molded article of the present invention is not particularly limited as long as it is 0.10 or more, but is preferably 0.12 or more, more preferably 0.15 or more, and particularly preferably 0.20 or more. An upper limit thereof is not particularly limited, but is usually 5.0 or less. When the coefficient of dynamic friction when IRM903 is deposited is too small, the dip-molded article will be inferior in the wet grip when water is deposited and when oil is deposited. A method for adjusting the coefficient of dynamic friction when IRM903 is deposited within the above range is not particularly limited, and examples thereof include a method for using the latex composition for dip-molding of the present invention described above as a latex composition for dip-molding.

Further, the dip-molded article of the present invention has a coefficient of dynamic friction of preferably 0.20 or more, more preferably 0.22 or more, and particularly preferably 0.30 or more on a surface on which water is deposited (hereinafter referred to as "coefficient of dynamic friction when water is deposited" as appropriate), from the viewpoint of the wet grip when water is deposited and when oil is deposited. An upper limit of the coefficient of dynamic friction when water is deposited of the dip-molded article of the present invention is not particularly limited, but is usually 5.0 or less. A method for adjusting the coefficient of dynamic friction when water is deposited within the above range is not particularly limited, and examples thereof include a method for using the latex composition for dip-molding of the present invention described above as a latex composition for dip-molding.

A method for measuring the coefficient of dynamic friction when IRM903 is deposited and the coefficient of dynamic friction when water is deposited includes, for example, the following method for measuring surface properties with a Heidon-type surface property measuring instrument (trade name "HEIDON-38", manufactured by Shinto Scientific Co., Ltd.). First, a 30 mm×90 mm test piece is cut out from a dip-molded article, the test piece is attached to a contact indenter having a 30 mm×30 mm flat surface, and test oil IRM903 or water is deposited on the test piece. Next, the test piece on which test oil IRM903 or water is deposited is moved horizontally with respect to a stainless plate (material: SUS304, a surface treated plate with buffing #400) under the conditions that test load is 200 g, test speed is 100 mm/min, moving distance is 30 mm, and the number of roundtrip is 5 times. At this time, frictional force F (unit: gf) applied to a dynamic strain amplifier of the Heidon-type surface property measuring instrument is measured. Then, according to the following equation, a coefficient of friction μ is calculated using the value of the first half of the roundtrip.

$$\rho = F/N$$

The dip-molded article of the present invention may be, for example, a dip-molded article comprising a polymer layer obtained by using the latex composition for dip-molding of the present invention described above, or a laminate of such a polymer layer and a substrate. With respect to the laminate of the polymer layer and the substrate, surface roughness, line roughness, the coefficient of dynamic friction when IRM903 is deposited, and the coefficient of dynamic friction when water is deposited on a surface of polymer layer side may be in the above ranges.

The dip-molded article of the present invention is preferably a molded article obtained by using the latex composition for dip-molding of the present invention described above. In other words, the dip-molded article of the present invention preferably comprises at least a polymer layer containing the conjugated diene polymer (A) having a glass transition temperature of 10° C. or less described above (hereinafter, as appropriate, referred to as "conjugated diene polymer (A)") and the polymer (B) having a glass transition temperature above 10° C. described above (hereinafter, as appropriate, referred to as "polymer (B)"). A suitable range of a content ratio of the conjugated diene polymer (A) and the polymer (B) in the dip-molded article of the present invention is the same as the range described above as the suitable range of the content ratio of the conjugated diene polymer (A) and the polymer (B) in the latex composition for dip-molding of the present invention.

The dip-molded article of the present invention may be a molded film comprising a latex composition for dip-molding and being obtained by immersing a mold for dip-molding in a latex composition for dip-molding such as the latex composition for dip-molding of the present invention described above. Alternatively, the dip-molded article of the present invention may be a laminate of a substrate and a polymer layer composed of a latex composition for dip-molding, wherein the laminate is obtained by immersing the substrate in the latex composition for dip-molding. In the following, a case in which the dip-molded article of the present invention is a laminate of a substrate and a polymer layer composed of a latex composition for dip-molding will be exemplified and explained. However, the present invention is not limited to such embodiments.

The substrate is not particularly limited, but when the dip-molded article of the present invention is used as a protective glove, a fiber substrate can be suitably used. Although the fiber substrate is not particularly limited, for example, twisted yarn of single fiber can be used as the fiber, and woven yarn made into a glove shape by weaving this twisted yarn can be used as a fiber substrate. Average thickness of the fiber substrate is preferably 50 to 3,000 μm, more preferably 100 to 2,000 μm.

The dip-molded article of the present invention can be produced, for example, by immersing a substrate in a latex composition for dip-molding to form a polymer layer composed of the latex composition for dip-molding on the substrate. At this time, it is preferable that the substrate is immersed in the latex composition for dip-molding in a condition in which a mold for molding having a desired shape is covered with the substrate in advance.

The mold for molding that the substrate covers is not particularly limited, and various molds made of a material such as ceramics, glass, metal, plastic, and the like may be used. The shape of the mold for molding can be a desired shape that matches the shape of the final product. For example, in the case in which the dip-molded article of the present invention is used as a protective glove, the mold for molding that the substrate covers is preferably any type of mold for molding a glove such as a mold for molding having a shape of a wrist to finger tips, and the like.

In addition, prior to immersing the substrate in the latex composition for dip-molding, it is preferable that the substrate is immersed in a coagulant solution in advance to deposit the coagulant solution on the substrate. At this time, it is preferable that the substrate is immersed in the coagulant solution in a condition in which a mold for molding having a desired shape is covered with the substrate in advance. Examples of the mold having the desired shape include those described above. Further, it is preferable to remove a solvent contained in the coagulant solution by drying after the substrate is immersed in the coagulant solution and the coagulant solution is deposited on the substrate. At this time, drying temperature is not particularly limited, and may be selected depending on the solvent used, but is preferably 10 to 80° C., and more preferably 15 to 70° C. Further, drying time is not particularly limited, but is preferably 600 to 1 seconds, and more preferably 300 to 5 seconds.

Then, the substrate on which the coagulant solution is deposited is immersed in a latex composition for dip-molding while the substrate covers the mold for molding having the desired shape. The latex composition for dip-molding is solidified and a polymer layer composed of the latex composition for dip-molding is deposited on the substrate.

It is preferable to dry the substrate after immersing the substrate in the latex composition for dip-molding. At this time, drying temperature is not particularly limited, but is preferably 10 to 80° C., and more preferably 15 to 80° C. Further, drying time is not particularly limited, but is preferably 120 minutes to 5 seconds, and more preferably 60 minutes to 10 seconds.

Note that, when a latex composition for dip-molding contains a sulfur cross-linking agent, the latex composition for dip-molding may be subjected to aging in advance (also referred to as pre-vulcanization).

The temperature condition at the time of aging is not particularly limited, but is preferably 20 to 50° C. In addition, the time at the time of aging is preferably 4 hours or more and 120 hours or less, more preferably 24 hours or more and 72 hours or less, from the viewpoint of preventing peeling between substrate and polymer layer made of latex composition for dip-molding and from the viewpoint of improving wear resistance when the obtained dip-molded article is used as a protective glove.

Then, it is preferable to cross-link the polymer components contained in latex composition for dip-molding by heating latex composition for dip-molding adhered to substrate.

The heating temperature for cross-linking is preferably 60 to 160° C., and more preferably 80 to 150° C. By adjusting the heating temperature within the above range, it is possible to shorten the time required for the cross-linking reaction to improve the productivity of the dip-molded article and to suppress the oxidative deterioration of the polymer content due to excessive heating, thereby improving the properties of the obtained dip-molded article. The heating time for cross-linking may be appropriately selected depending on the heating temperature, but is usually 5 to 120 minutes.

It is preferable to remove water-soluble impurities (an emulsifier, a water-soluble polymer, a coagulant, and the like) from the polymer layer of the dip-molded article thus obtained, if necessary, by immersing the polymer layer famed on the substrate in warm water of 20 to 80° C. for about 0.5 to 60 minutes. A process to immerse such a polymer layer in warm water may be performed after cross-linking the polymer component in the polymer layer, but is preferably performed prior to cross-linking the polymer component in the polymer layer from the viewpoint of more efficiently removing the water-soluble impurities.

After immersing in warm water, drying may be further performed. At this time, the drying temperature and the drying time are not particularly limited, but may be the same as those of the drying temperature and the drying time in the drying step after immersing in the latex composition for dip-molding described above.

Then, the dip-molded article can be obtained by forming the polymer layer on the substrate in a state in which the substrate covers the mold for molding as described above, and then detaching (or removing) the dip-molded article from the mold for molding. As a detaching method, a method of peeling the dip-molded article from the mold for molding by hand or a method of peeling the dip-molded article by water pressure or pressure of compressed air can be employed.

Prior to detaching or after detaching the dip-molded article from the mold for molding, heat treatment (post-cross-linking step) may be further performed for 10 to 120 minutes at a temperature of 60 to 120° C. Further, after the dip-molded article is detached from the mold for molding, a surface treatment layer may be famed on the inner and/or outer surface of the dip-molded article by a chlorination treatment, a coating treatment, and the like.

The dip-molded article of the present invention thus obtained is produced by forming the polymer layer comprising the latex composition for dip-molding of the present invention described above on the substrate with the coagulation using the coagulant. Thus, the film thickness of the polymer layer can be relatively thick, such as preferably 0.05 to 1.0 mm, more preferably 0.06 to 0.8 mm, still more preferably 0.07 to 0.7 mm, and particularly preferably greater than 0.3 mm, and less than or equal to 0.7 mm. As a result, the wear resistance of the obtained dip-molded article can be enhanced. In addition, in general, when the film thickness is relatively thick, the wet grip when water is deposited and when oil is deposited tends to be decreased. However, even when the film thickness is relatively thick (e.g., even when the film thickness is more than 0.3 mm), the dip-molded article of the present invention can achieve the excellent wet grip when water is deposited and when oil is deposited.

The dip-molded article of the present invention is excellent in the wear resistance and the wet grip when water is deposited and when oil is deposited, and can be suitably used, for example, in glove applications, particularly in protective glove applications. In the above, a case in which the dip-molded article of the present invention is the laminate of the substrate and the polymer layer composed of the latex composition for dip-molding has been exemplified and explained. However, as described above, the present invention is not limited to such embodiments. A molded film composed of the latex composition for dip-molding can be of course obtained by immersing a mold for dip-molding in the latex composition for dip-molding.

EXAMPLE

Hereinafter, the present invention will be described in detail by way of Examples, however, the present invention is not limited to these Examples. In each example, the term "part(s)" is based on weight unless otherwise specified. Note that each property was measured to the following effect.

<Viscosity of Aqueous Solution of Water-Soluble Polymer>

A water-soluble polymer was precisely weighed and charged in a beaker. Water was added to the beaker and stirred with a stirrer to uniformly dissolve to the water-soluble polymer. As a result, an aqueous solution of the water-soluble polymer was obtained having 1 wt % or 4 wt %. Viscosity of the aqueous solution of the water-soluble polymer was measured by using a B-type viscometer at 25° C. under the condition of a rotational speed of 6 rpm.

<Viscosity of Latex Composition for Dip-Molding>

Viscosity of the latex composition for dip-molding was measured by using a B-type viscometer at 25° C. under the condition of a rotational speed of 6 rpm.

<Acid Amount>

An acid amount was measured according to the following method.

First, 50 g of an aqueous solution of a water-soluble polymer in which solid content concentration was adjusted to 0.2 to 1% by adding distilled water (a solid content of the water-soluble polymer in 50 g of the aqueous solution of the water-soluble polymer is defined as W (g)) was charged into a 200 ml glass vessel that had been washed with distilled water. The glass vessel was set in a solution conductivity meter (manufactured by Kyoto Electronics Manufacturing Co., Ltd.: CM-117, used cell type: K-121) to start stirring. Next, in a state of continuing the stirring, 0.1N sodium hydroxide was added so that a pH of the aqueous solution became 12 or more, and an electrical conductivity was measured after 6 minutes, and the obtained measured value was defined as the electrical conductivity at the start of measurement. Then, 0.5 ml of 0.1N hydrochloric acid was added to the aqueous solution of the water-soluble polymer, and the electrical conductivity was measured after 30 seconds. An operation of adding 0.5 ml of 0.1N hydrochloric acid again and measuring the electrical conductivity after 30 seconds of the addition was performed repeatedly every 30 seconds until the measured electrical conductivity became equal to or higher than the electrical conductivity at the start of measurement.

The obtained electrical conductivity data were plotted on a graph with the vertical axis of electrical conductivity (mS) and the horizontal axis of cumulative amount of added hydrochloric acid (mmol) to obtain a curve of the amount of hydrochloric acid vs. the electrical conductivity having three inflection points as shown in FIG. 1. X-coordinates of the obtained three inflection points and X-coordinate at the end of the addition of hydrochloric acid were defined as, from the smallest to the largest, $P_1$, $P_2$, $P_3$, and $P_4$, respectively. Approximate straight lines $L_1$, $L_2$, $L_3$ and $L_4$ were obtained by the least squares method respectively for the data in four sections, from 0 to $P_1$, from $P_1$ to $P_2$, from $P_2$ to $P_3$, and from $P_3$ to $P_4$, in the X-coordinates. In addition, X-coordinate of the intersection of $L_1$ and $L_2$ is set to $A_1$ (mmol), X-coordinate of the intersection of $L_2$ and $L_3$ is set to $A_2$ (mmol), and X-coordinate of the intersection of $L_3$ and $L_4$ is set to $A_3$ (mmol). Then, an acid amount per 1 g of the water-soluble polymer was determined according to the following equation.

Acid amount per 1 g of water-soluble polymer=$(A_2-A_1)/W$ (mmol/g)

<Surface Tension>

Surface tension of a latex composition for dip-molding was measure with a surface tensiometer (DY-300, manufactured by Kyowa Interface Science Co., Ltd.). Measured value was provided in the unit of mN/m. The measurement was carried out at 25° C.

<Wear Resistance>

A wear test was conducted and the evaluation was performed using Martindale abrasion tester (product name: "STM 633", manufactured by SATRA Technology) in accordance with a method described in EN 388. Specifically, the protective glove (dip-molded article) was repeatedly rubbed while a predetermined weight was applied thereto. The number of times of rubbing before breakage of the glove was obtained. According to the number of times of rubbing before breakage of the glove, each glove was evaluated to be classified into either one of LEVEL 0 to LEVEL 4.

LEVEL 4: The number of rotations is 8,000 or more.
LEVEL 3: The number of rotations is 2,000 or more and less than 8,000.
LEVEL 2: The number of rotations is 500 or more and less than 2,000.
LEVEL 1: The number of rotations is 100 or more and less than 500.
LEVEL 0: The number of rotations is less than 100.

<Wet Grip when Water or Oil is Deposited>

Conical metallic molds weighing 1.0 kg, 2.0 kg, 3.0 kg, 4.0 kg, 5.0 kg, 7.0 kg, and 10 kg were prepared. Water or test oil IRM903 was deposited on these metal molds. Then, an operator wearing a protective glove (dip-molded article) lifted the metallic molds on which water or test oil IRM903 was deposited, from the lightest to the heaviest. The maximum weight that the operator could lift was determined. The measurement was performed by the same operator. It can be judged that the larger the maximum weight that the operator was able to lift is, the better the wet grip is.

<Resistance to Permeation of Chemicals>

By referring to the dish method described in JIS Z 0208, permeability of a solvent gas was measured according to the following procedure.

(1) Protective glove (dip-molded article) was cut to an appropriate circular size to be a sample.
(2) The weight of an aluminum dish and the sample ($W_1$) was measured.
(3) 50 mL of n-hexane was charged in the aluminum dish.
(4) A rubber layer of the sample (dip-molded article) was placed on the aluminum dish in which n-hexane was charged so as to be in contact with n-hexane.
(5) The aluminum dish and the sample were firmly adhered to each other with an anchorage.
(6) The weight of the whole aluminum dish ($W_2$) was measured.
(7) The aluminum dish was turned over and left in a draft at room temperature to allow n-hexane to be in contact with the sample.
(8) After leaving for 72 hours, the weight of the whole aluminum dish ($W_3$) was measured.
(9) A ratio of n-hexane permeated through the sample and evaporated (solvent gas permeability) was calculated according to the following equation.

Solvent gas permeability (%)=$100-((W_3-W_1)\div(W_2-W_1)\times100)$

It can be judged that the smaller the value of the solvent gas permeability is, the better the resistance to permeation of chemicals is.

<Surface Roughness and Line Roughness of Surface of Protective Glove>

Surface roughness and line roughness of a surface of a protective glove (dip-molded article) (a surface of polymer layer side) were measured according to the following measurement condition with a laser microscope (VK-X100 manufactured by KEYENCE CORPORATION).

<Measurement Conditions>

Measurement mode: surface shape

Measurement quality: high definition

Objective lens: CF Plan 100x/0.95° ∞/0 EPI

Measurement area: 960 μm×520 μm

Z-direction measurement pitch: 0.12 μm

Arithmetic mean roughness of height data obtained by the measurement was calculated by analysis software ("surface roughness" measurement function of VK shape analysis application VK-H1XJ manufactured by KEYENCE CORPORATION).

<Coefficient of Dynamic Friction when Water or IRM903 is Deposited>

A coefficient of dynamic friction when water or IRM903 was deposited was measured according to the following method with a Heidon-type surface property measuring instrument (trade name "HEIDON-38", manufactured by Shinto Scientific Co., Ltd.). First, a 30 mm×90 mm test piece was cut out from a dip-molded article, the test piece was attached to a contact indenter having a 30 mm×30 mm flat surface, and the test oil IRM903 or water was deposited on the test piece. Next, the test piece on which the test oil IRM903 or water is deposited was moved horizontally with respect to a stainless plate (material: SUS304, a surface treated plate with buffing #400) under the conditions that test load was 200 g, test speed was 100 mm/min, moving distance was 30 mm, and the number of roundtrip was 5 times. At this time, frictional force F (unit: gf) applied to a dynamic strain amplifier of the Heidon-type surface property measuring instrument was measured. Then, according to the following equation, a coefficient of friction μ was calculated using the value of the first half of the roundtrip.

$$\rho = F/N$$

In the present measurement, the value of the coefficient of friction μ was continuously recorded between the state in which the test piece was at rest and the state in which the test piece was moving at a constant speed as a test speed, and the value when the coefficient of friction μ was in a constant state was taken as the coefficient of dynamic friction.

<Flexibility>

A palm part of a protective glove (dip-molded article) was cut into a 60 mm×60 mm shape to obtain a sample for measurement. Then, using indentation test equipment 20 as shown in FIG. 1 of international publication 2018/174068 (Product name "HG1003-SL", manufactured by HORI-UCHI ELECTRONICS CO., LTD. was used as a measuring unit), the Young's modulus of the sample for measurement was measured according to the method disclosed in international publication 2018/174068. Specific conditions were as shown below. At the time of the measurement, the measurement sample was suctioned by suction table 30 in the state where resin tapes were attached to the surface opposite to the surface on which the polymer layer was foiled (measurement surface) of the measurement sample at a positon corresponding to the plurality of suction holes of the suction table 30, the measurement was conducted by pressing a spherical indenter from the rubber layer side while suction was performed by suction table 30. In addition, the measurement was carried out at three points of the sample for measurement with the 60 mm×60 mm shape, and an average value of the measurement results of the Young's modulus at the three points was obtained, and this was used as the Young's modulus in each Example. When the Young's modulus is 580 kPa or less, the flexibility can be judged to be sufficiently excellent.

Spherical indenter: a spherical indenter made of SUS having a diameter of 10 mm

Indentation speed: 0.5 mm/s

Maximum load: 0.5N

Initial position of spherical indenter: −6 mm (a position 6 mm above suction table 30)

<Appearance>

Appearance including the presence or absence of a crack was evaluated by visually observing a polymer layer of a protective glove (dip-molded article).

Example 1

(Preparation of Aqueous Dispersion of Colloidal Sulfur)

1.0 part of colloidal sulfur (manufactured by Hosoi Chemical Industry Co., Ltd.), 0.5 parts of dispersant (product name "DEMOL N", manufactured by Kao Corporation), 0.0015 parts of an aqueous solution of potassium hydroxide having a concentration of 5 wt % (manufactured by Wako Pure Chemical Industries, Ltd.), and 1.0 part of water were ground and stirred in a ball mill for 48 hours to prepare an aqueous dispersion of colloidal sulfur having a solid content concentration of 50 wt %.

(Preparation of Aqueous Dispersion of Zinc Dibutyldithiocarbamate, Aqueous Dispersion of Zinc Oxide, and Aqueous Dispersion of Titanium Oxide)

In place of the colloidal sulfur, zinc dibutyldithiocarbamate (manufactured by Ouchi Shinko Chemical Industry Co., Ltd), zinc oxide (manufactured by SEIDO CHEMICAL INDUSTRY CO., LTD.), and titanium oxide were used, respectively. Except for that, in the same manner as described above, each of an aqueous dispersion of zinc dibutyldithiocarbamate, an aqueous dispersion of zinc oxide, and an aqueous dispersion of titanium oxide were prepared.

(Preparation of Latex of Nitrile Group-Containing Conjugated Diene Polymer (A-1))

65 parts of 1,3-butadiene as a conjugated diene monomer, 30 parts of acrylonitrile as an α,β-ethylenically unsaturated nitrile monomer, 5 parts of methacrylic acid as an ethylenically unsaturated monocarboxylic acid monomer, 0.4 parts of t-dodecyl mercaptan, 132 parts of ion-exchanged water, 3 parts of sodium dodecylbenzene sulfonate, 0.5 parts of β-naphthalene sulfonic acid formalin condensate sodium salt, 0.3 parts of potassium persulfate, and 0.05 parts of ethylenediaminetetraacetic acid sodium salt were charged into a polymerization reactor, and polymerization was carried out by holding a polymerization temperature of 30 to 40° C. The reaction was carried out until a polymerization conversion ratio reached 94% to obtain a latex of copolymer.

Then, after removing unreacted monomers from the obtained latex of copolymer, by adjusting a pH and solid content concentration of the latex of copolymer, a latex of nitrile group-containing conjugated diene polymer (A-1) having a solid content concentration of 40 wt %, a pH of 8, and a surface tension of 31 mN/m at 25° C. was obtained. The glass transition temperature (Tg) of the nitrile group-containing conjugated diene polymer (A-1) contained in the obtained latex of nitrile group-containing conjugated diene polymer (A-1) was measured to be −27° C. The weight average particle size of the particles of the nitrile group-containing conjugated diene polymer (A-1) constituting the latex of nitrile group-containing conjugated diene polymer (A-1) was 110 nm. A monomer composition of the nitrile group-containing conjugated diene polymer (A-1) was almost the same ratio as the charging ratio.

(Preparation of Latex Composition for Dip-Molding)

The latex of nitrile group-containing conjugated diene polymer (A-1) obtained above and a latex of vinyl chloride resin (B-1) were mixed so that a weight ratio of "nitrile group-containing conjugated diene polymer (A-1):vinyl chloride resin (B-1)" becomes 70:30. An aqueous solution of potassium hydroxide having a concentration of 5 wt % was added thereto, so that a latex composition having a solid content concentration of 45 wt % and a pH of 9.0 was prepared. The glass transition temperature (Tg) of the vinyl chloride resin (B-1) was 82° C., the K value of the vinyl chloride resin (B-1) was 65, the weight average particle size of the particles of the vinyl chloride resin (B-1) was 1.3 µm, and the vinyl chloride resin (B-1) was substantially free of a plasticizer. In addition, surface tension of the latex of vinyl chloride resin (B-1) at 25° C. was 36 mN/m.

Then, aqueous dispersions of each compounding agent prepared above was added thereto so that 1.0 part of colloidal sulfur, 1.0 part of zinc dibutyldithiocarbamate, 1.5 parts of zinc oxide, and 3.0 parts of titanium oxide were respectively realized based on 100 parts of polymer components of the latex composition obtained above, in tams of a solid content. Note that, during the addition of the aqueous dispersion of the compounding agents, a predetermined amount of the aqueous dispersion of the compounding agents was slowly added while stirring the latex composition. Then, after the compounding agents were mixed uniformly, 0.5 parts of carboxymethyl cellulose (product name "Daicel2200" manufactured by Daicel Corporation, weight average molecular weight: 550,000, acid amount: 3.7 mmol/g) was added as a water-soluble polymer, and solid content concentration was adjusted so as to obtain a latex composition for dip-molding having a solid content concentration of 40 wt % and a viscosity of 3,000 mPa·s at 25° C. Surface tension of the obtained latex composition for dip-molding was measured. The result is shown in Table 1.

(Preparation of Coagulant Solution)

A coagulant solution was prepared by dissolving calcium nitrate as a coagulant to methanol with a ratio of 3.0 wt %.

(Production of Protective Glove (Dip-Molded Article))

First, the latex composition for dip-molding obtained above was subjected to aging (also referred to as pre-vulcanization) at a temperature of 30° C. for 48 hours. Then, a ceramic glove mold covered with a glove-shaped fiber substrate (material: nylon, linear density: 300 denier, gauge number: 13 gauge, thickness: 0.8 mm) was immersed in the coagulant solution prepared above for 5 seconds. After the glove mold was pulled up from the coagulant solution, the glove mold was dried at a temperature of 30° C. for 1 minute. Next, the ceramic glove mold was immersed in the above latex composition for dip-molding for five seconds, and pulled up from the latex composition for dip-molding. Thereafter, the ceramic glove mold was dried at a temperature of 30° C. for 30 minutes. Then, the ceramic glove mold was heated at a temperature of 70° C. for 10 minutes to allow to cross-link, so that a polymer layer having a film thickness of 0.6 mm was famed on the fiber substrate. Thereafter, the ceramic glove mold on which the polymer layer was famed was immersed in warm water at 60° C. for 90 seconds to elute water-soluble impurities from the polymer layer. Thereafter, the ceramic glove mold was dried at a temperature of 30° C. for 10 minutes. Further, heat treatment was performed at a temperature of 125° C. for 30 minutes, so that polymers in the polymer layer were subjected to cross-linking treatment. Then, the fiber substrate on which the polymer layer was famed was peeled from the ceramic glove mold to obtain a protective glove (dip-molded article).

After that, using the obtained protective glove (dip-molded article), the wear resistance, the wet grip when when water was deposited, the wet grip when oil was deposited, the resistance to permeation of chemicals, the surface roughness, the line roughness, the coefficient of dynamic friction when water was deposited, the coefficient of dynamic friction when IRM903 was deposited, and the flexibility were measured, together with evaluation of the appearance. The results are shown in Table 1.

Example 2

A ratio of the latex of nitrile group-containing conjugated diene polymer (A-1) and the latex of vinyl chloride resin (B-1) in the formulation was changed to 50:50 in tams of the weight ratio of "nitrile group-containing conjugated diene polymer (A-1):vinyl chloride resin (B-1)", and the amount of carboxymethyl cellulose used as the water-soluble polymer was changed to 1.00 part. Except for these, in the same manner as in Example 1, a latex composition for dip-molding having a solid content concentration of 37 wt % and a viscosity at 25° C. of 3,000 mPa·s was obtained. Then, using the obtained latex composition for dip-molding, in the same manner as in Example 1, a protective glove (dip-molded article) having a polymer layer with a film thickness of 0.6 mm was obtained. Evaluation was performed in the same manner. The results are shown in Table 1.

Example 3

In place of the latex of vinyl chloride resin (B-1), a latex of vinyl chloride resin (B-2) was used. (The glass transition temperature (Tg) of the vinyl chloride resin (B-2) was 82° C., the K value of the vinyl chloride resin (B-2) was 77, the weight average particle size of the particles of the vinyl chloride resin (B-2) was 1.2 µm, and the vinyl chloride resin (B-2) was substantially free of a plasticizer. In addition, surface tension of the latex of vinyl chloride resin (B-2) at 25° C. was 34 mN/m.) Along with this, the amount of carboxymethyl cellulose used as the water-soluble polymer was changed to 0.60 parts. Except for these, in the same manner as in Example 1, a latex composition for dip-molding having a solid content concentration of 39 wt % and a viscosity at 25° C. of 3,000 mPa·s was obtained. Then, using the obtained latex composition for dip-molding, in the same manner as in Example 1, a protective glove (dip-molded article) having a polymer layer with a film thickness of 0.6 mm was obtained. Evaluation was performed in the same manner. The results are shown in Table 1.

Example 4

A ratio of the latex of nitrile group-containing conjugated diene polymer (A-1) and the latex of vinyl chloride resin (B-2) in the formulation was changed to 50:50 in tams of the weight ratio of "nitrile group-containing conjugated diene polymer (A-1):vinyl chloride resin (B-2)", and the amount of carboxymethyl cellulose used as the water-soluble polymer was changed to 1.1 parts. Except for these, in the same manner as in Example 3, a latex composition for dip-molding having a solid content concentration of 36 wt % and a viscosity at 25° C. of 3,000 mPa·s was obtained. Then, using the obtained latex composition for dip-molding, in the same manner as in Example 1, a protective glove (dip-molded article) having a polymer layer with a film thickness of 0.6 mm was obtained. Evaluation was performed in the same manner. The results are shown in Table 1.

Example 5

In place of the latex of vinyl chloride resin (B-1), a latex of vinyl chloride-vinyl acetate copolymer resin (B-3) was used. (The content ratio of vinyl chloride unit was 70 wt %, the glass transition temperature (Tg) of the vinyl chloride-vinyl acetate copolymer resin (B-3) was 63° C., the weight average particle size of the particles of the vinyl chloride-vinyl acetate copolymer resin (B-3) was 0.14 µm, and the vinyl chloride-vinyl acetate copolymer resin (B-3) was substantially free of a plasticizer. In addition, surface tension of the latex of vinyl chloride-vinyl acetate copolymer resin (B-3) at 25° C. was 36 mN/m.) Along with this, the amount of carboxymethyl cellulose used as the water-soluble polymer was changed to 0.40 parts. Except for these, in the same manner as in Example 1, a latex composition for dip-molding having a solid content concentration of 42 wt % and a viscosity at 25° C. of 3,000 mPa·s was obtained. Then, using the obtained latex composition for dip-molding, in the same manner as in Example 1, a protective glove (dip-molded article) having a polymer layer with a film thickness of 0.6 mm was obtained. Evaluation was performed in the same manner. The results are shown in Table 1.

Example 6

In place of the latex of the vinyl chloride resin (B-1), a latex of vinyl chloride-acrylic acid ester copolymer resin (B-4) was used. (The content ratio of vinyl chloride unit was 85 wt %, the glass transition temperature (Tg) of the vinyl chloride-acrylic acid ester copolymer resin (B-4) was 60° C., the weight average particle size of the particles of the vinyl chloride-acrylic acid ester copolymer resin (B-4) was 0.70 µm, and the vinyl chloride-acrylic acid ester copolymer resin (B-4) was substantially free of a plasticizer. In addition, surface tension of the latex of vinyl chloride-acrylic acid ester copolymer resin (B-4) at 25° C. was 33 mN/m.) Along with this, the amount of carboxymethyl cellulose used as the water-soluble polymer was changed to 0.35 parts. Except for these, in the same manner as in Example 1, a latex composition for dip-molding having a solid content concentration of 43 wt % and a viscosity at 25° C. of 3,000 mPa·s was obtained. Then, using the obtained latex composition for dip-molding, in the same manner as in Example 1, a protective glove (dip-molded article) having a polymer layer with a film thickness of 0.6 mm was obtained. Evaluation was performed in the same manner. The results are shown in Table 1.

Example 7

In place of the latex of vinyl chloride resin (B-1), a latex of vinyl chloride resin (B-5) was used. (The glass transition temperature (Tg) of the vinyl chloride resin (B-5) was 80° C., the weight average particle size of the particles of the vinyl chloride resin (B-5) was 0.08 µm, and the vinyl chloride resin (B-5) was substantially free of a plasticizer. In addition, surface tension of the latex of vinyl chloride resin (B-5) at 25° C. is 59 mN/m.) Along with this, the amount of carboxymethyl cellulose used as the water-soluble polymer was changed to 1.00 part. Except for these, in the same manner as in Example 1, a latex composition for dip-molding having a solid content concentration of 35 wt % and a viscosity at 25° C. of 3,000 mPa·s was obtained. Then, using the obtained latex composition for dip-molding, in the same manner as in Example 1, a protective glove (dip-molded article) having a polymer layer with a film thickness of 0.6 mm was obtained. Evaluation was performed in the same manner. The results are shown in Table 1.

Example 8

In place of the latex of vinyl chloride resin (B-1), a latex of vinyl chloride resin (B-6) was used. (The glass transition temperature (Tg) of the vinyl chloride resin (B-6) was 80° C., the K value of the vinyl chloride resin (B-6) was 75, the weight average particle size of the particles of the vinyl chloride resin (B-6) was 2.00 µm, and the vinyl chloride resin (B-6) was substantially free of a plasticizer. In addition, surface tension of the latex of vinyl chloride resin (B-6) at 25° C. is 42 mN/m.) Along with this, the amount of carboxymethyl cellulose used as the water-soluble polymer was changed to 1.30 parts. Except for these, in the same manner as in Example 1, a latex composition for dip-molding having a solid content concentration of 34 wt % and a viscosity at 25° C. of 3,000 mPa·s was obtained. Then, using the obtained latex composition for dip-molding, in the same manner as in Example 1, a protective glove (dip-molded article) having a polymer layer with a film thickness of 0.6 mm was obtained. Evaluation was performed in the same manner. The results are shown in Table 1.

Example 9

As the water-soluble polymer, in place of 1.00 part of carboxymethyl cellulose, 1.30 parts of polyvinyl alcohol (product name "22-88 (PVA-217)" manufactured by KURARAY CO., LTD., mean degree of polymerization: 1,750, acid amount: 0.1 mmol/g) was used. Except for this, in the same manner as in Example 7, a latex composition for dip-molding having a solid content concentration of 41 wt % and a viscosity at 25° C. of 3,000 mPa·s was obtained. Then, using the obtained latex composition for dip-molding, in the same manner as in Example 1, a protective glove (dip-molded article) having a polymer layer with a film thickness of 0.6 mm was obtained. Evaluation was performed in the same manner. The results are shown in Table 1.

Example 10

As the water-soluble polymer, in place of 1.00 part of carboxymethyl cellulose, 0.8 parts of carboxylic acid-modified polyvinyl alcohol (product name "XL-318" manufactured by KURARAY CO., LTD., mean degree of polymerization: 1,800, acid amount: 1.5 mmol/g) was used. Except for this, in the same manner as in Example 7, a latex composition for dip-molding having a solid content concentration of 42 wt % and a viscosity at 25° C. of 3,000 mPa·s was obtained. Then, using the obtained latex composition for dip-molding, in the same manner as in Example 1, a protective glove (dip-molded article) having a polymer layer with a film thickness of 0.6 mm was obtained. Evaluation was pertained in the same manner. The results are shown in Table 1.

Example 11

In place of 1.00 part of carboxymethyl cellulose, 0.3 parts of polyacrylic acid (product name "ARON A-7100" manufactured by Toagosei Company, Limited, weight average molecular weight: 500,000, acid amount: 11.0 mmol/g) was used. Except for this, in the same manner as in Example 7, a latex composition for dip-molding having a solid content concentration of 40 wt % and a viscosity at 25° C. of 3,000 mPa·s was obtained. Then, using the obtained latex composition for dip-molding, in the same manner as in Example 1, a protective glove (dip-molded article) having a polymer layer with a film thickness of 0.6 mm was obtained. Evaluation was performed in the same manner. The results are shown in Table 1.

Example 12

In place of the latex of vinyl chloride resin (B-1), a latex of polystyrene resin (B-7) was used. (The glass transition temperature (Tg) of the polystyrene resin (B-7) was 85° C., and weight average particle size of the particles of the polystyrene resin (B-7) was 300 nm. In addition, surface tension of the latex of polystyrene resin (B-7) at 25° C. was 43 mN/m.) Along with this, the amount of carboxymethyl cellulose used as the water-soluble polymer was changed to 0.4 parts. Except for these, in the same manner as in Example 1, a latex composition for dip-molding having a solid content concentration of 40 wt % and a viscosity at 25° C. of 3,000 mPa·s was obtained. Then, using the obtained latex composition for dip-molding, in the same manner as in Example 1, a protective glove (dip-molded article) having a polymer layer with a film thickness of 0.6 mm was obtained. Evaluation was pertained in the same manner. The results are shown in Table 1.

Comparative Example 1

The latex of vinyl chloride resin (B-1) was not blended. The formulation was converted based on 100 parts of the polymer components of the latex of nitrile group-containing conjugated diene polymer (A-1) in terms of a solid content. In addition, the amount of carboxymethyl cellulose used as the water-soluble polymer was changed to 0.30 parts. Except for these, in the same manner as in Example 1, a latex composition for dip-molding having a solid content concentration of 40 wt % and a viscosity at 25° C. of 3,000 mPa·s was obtained. Then, using the obtained latex composition for dip-molding, in the same manner as in Example 1, a protective glove (dip-molded article) having a polymer layer with a film thickness of 0.6 mm was obtained. Evaluation was performed in the same manner. The results are shown in Table 1.

Comparative Example 2

The latex of nitrile group-containing conjugated diene polymer (A-1) was not blended. The formulation was converted based on 100 parts of the polymer components of the latex of vinyl chloride resin (B-1) in tams of a solid content. In addition, the amount of carboxymethyl cellulose used as the water-soluble polymer was changed to 2.90 parts. Except for these, in the same manner as in Example 1, a latex composition for dip-molding having a solid content concentration of 29 wt % and a viscosity at 25° C. of 3,000 mPa·s was obtained. Then, using the obtained latex composition for dip-molding, in the same manner as in Example 1, a protective glove (dip-molded article) having a polymer layer with a film thickness of 0.6 mm was obtained. Evaluation was performed in the same manner. The results are shown in Table 1.

Comparative Example 3

The latex of nitrile group-containing conjugated diene polymer (A-1) was not blended. The formulation was converted based on 100 parts of the polymer components of the latex of vinyl chloride resin (B-2) in tams of a solid content. In addition, the amount of carboxymethyl cellulose used as the water-soluble polymer was changed to 3.2 parts. Except for these, in the same manner as in Example 3, a latex composition for dip-molding having a solid content concentration of 26.0 wt % and a viscosity at 25° C. of 3,000 mPa·s was obtained. Then, using the obtained latex composition for dip-molding, in the same manner as in Example 1, a protective glove (dip-molded article) having a polymer layer with a film thickness of 0.6 mm was obtained. Evaluation was performed in the same manner. The results are shown in Table 1.

Comparative Example 4

The amount of carboxymethyl cellulose used as the water-soluble polymer was changed to 1.0 part. Except for this, in the same manner as in Comparative Example 1, a latex composition for dip-molding having a solid content concentration of 40 wt % was obtained. The obtained latex composition for dip-molding was foamed by stirring with HOMOGENIZING DISPER Model 2.5. Then, using the obtained foamed latex composition for dip-molding, in the same manner as in Example 1, a protective glove (dip-molded article) having a polymer layer with a film thickness of 0.6 mm was obtained. Evaluation was performed in the same manner. The results are shown in Table 1.

TABLE 1

| | | Example | | | | | | | | |
|---|---|---|---|---|---|---|---|---|---|---|
| | | 1 | 2 | 3 | 4 | 5 | 6 | 7 | 8 | 9 |
| Fomlulation | | | | | | | | | | |
| Latex of nitrile group-containing conjugated diene polymer (A-1)*1) | (parts) | 70 | 50 | 70 | 50 | 70 | 70 | 70 | 70 | 70 |
| Latex of vinyl chloride resin (B-1)*1) | (parts) | 30 | 50 | — | — | — | — | — | — | — |
| Latex of vinyl chloride resin (B-2)*1) | (parts) | — | — | 30 | 50 | — | — | — | — | — |

TABLE 1-continued

| | | | | | | | | | | |
|---|---|---|---|---|---|---|---|---|---|---|
| Latex of vinyl chloride-vinyl acetate copolymer resin (B-3)*1) | (parts) | — | — | — | — | 30 | — | — | — | — |
| Latex of vinyl chloride-acrylic acid ester copolymer resin (B-4)*1) | (parts) | — | — | — | — | — | 30 | — | — | — |
| Latex of vinyl chloride resin (B-5)*1) | (parts) | — | — | — | — | — | — | 30 | — | 30 |
| Latex of vinyl chloride resin (B-6)*1) | (parts) | — | — | — | — | — | — | — | 30 | — |
| Latex of polystyrene resin (B-7)*1) | (parts) | — | — | — | — | — | — | — | — | — |
| Colloidal sulfur | (parts) | 1.0 | 1.0 | 1.0 | 1.0 | 1.0 | 1.0 | 1.0 | 1.0 | 1.0 |
| Zinc dibutyldithiocarbamate | (parts) | 1.0 | 1.0 | 1.0 | 1.0 | 1.0 | 1.0 | 1.0 | 1.0 | 1.0 |
| Zinc oxide | (parts) | 1.5 | 1.5 | 1.5 | 1.5 | 1.5 | 1.5 | 1.5 | 1.5 | 1.5 |
| Titanium oxide | (parts) | 3.0 | 3.0 | 3.0 | 3.0 | 3.0 | 3.0 | 3.0 | 3.0 | 3.0 |
| Carboxymethyl cellulose | (parts) | 0.50 | 1.00 | 0.60 | 1.10 | 0.40 | 0.35 | 1.00 | 1.30 | — |
| Polyvinyl alcohol | (parts) | — | — | — | — | — | — | — | — | 1.30 |
| Carboxylic acid modified polyvinyl alcohol | (parts) | — | — | — | — | — | — | — | — | — |
| Polyacrylic acid | (parts) | — | — | — | — | — | — | — | — | — |
| Properties of water-soluble polymer | | | | | | | | | | |
| Acid amount | (mmol/g) | 3.7 | 3.7 | 3.7 | 3.7 | 3.7 | 3.7 | 3.7 | 3.7 | 0.1 |
| Viscosity of aqueous solution of water-soluble polymer | (mPa·s) | 850 | 850 | 850 | 850 | 850 | 850 | 850 | 850 | 15 |
| Solid content concentration of aqueous solution of water-soluble polymer when measuring viscosity | (mass %) | 1 | 1 | 1 | 1 | 1 | 1 | 1 | 1 | 4 |
| Evaluation | | | | | | | | | | |
| Surface tension | (mN/m) | 36 | 37 | 36 | 37 | 42 | 41 | 49 | 40 | 49 |
| Wear test (wear resistance) | | LEVEL3 | LEVEL2 | LEVEL3 | LEVEL2 | LEVEL4 | LEVEL2 | LEVEL3 | LEVEL2 | LEVEL3 |
| Amount of wear when the number of rotations is 100 (wear resistance) | (mg) | 14.3 | 15.5 | 11.9 | 16.1 | 13.1 | 14.6 | 13.4 | 14.7 | 13.7 |
| Maximum weight that can be lifted (wet grip when water is deposited) | (kg) | 3.0 | 5.0 | 3.0 | 5.0 | 10.0 | 7.0 | 7.0 | 7.0 | 7.0 |
| Maximum weight that can be lifted (wet grip when oil is deposited) | (kg) | 1.0 | 3.0 | 1.0 | 3.0 | 3.0 | 3.0 | 5.0 | 3.0 | 5.0 |
| Solvent gas permeability (resistance to permeation of chemicals) | (%) | 2.2 | 2.4 | 2.0 | 2.3 | 1.9 | 1.8 | 2.0 | 1.9 | 0.8 |
| Surface roughness of surface of protective glove | (μm) | 6 | 12 | 5 | 15 | 14 | 3 | 2 | 18 | 1 |
| Line roughness of surface of protective glove | (μm) | 4 | 7 | 6 | 10 | 12 | 1.0 | 0.9 | 10 | 0.8 |
| Coefficient of dynamic friction when water is deposited | — | 0.29 | 0.39 | 0.29 | 0.39 | 0.47 | 0.49 | 0.44 | 0.49 | 0.40 |
| Coefficient of dynamic frictional when IRM903 is deposited | — | 0.18 | 0.29 | 0.18 | 0.29 | 0.28 | 0.29 | 0.33 | 0.29 | 0.30 |
| Young's modulus (flexibility) | (kPa) | 350 | 550 | 300 | 460 | 270 | 250 | 500 | 450 | 500 |
| Appearance (crack) | | None | None | None | None | None | None | None | None | None |

| | | Example | | | Comparative Example | | | |
|---|---|---|---|---|---|---|---|---|
| | | 10 | 11 | 12 | 1 | 2 | 3 | 4 |
| Formulation | | | | | | | | |
| Latex of nitrile group-containing conjugated diene polymer (A-1)*1) | (parts) | 70 | 70 | 70 | 100 | — | — | 100 |
| Latex of vinyl chloride resin (B-1)*1) | (parts) | — | — | — | — | 100 | — | — |
| Latex of vinyl chloride resin (B-2)*1) | (parts) | — | — | — | — | — | 100 | — |
| Latex of vinyl chloride-vinyl acetate copolymer resin (B-3)*1) | (parts) | — | — | — | — | — | — | — |
| Latex of vinyl chloride-acrylic acid ester copolymer resin (B-4)*1) | (parts) | — | — | — | — | — | — | — |
| Latex of vinyl chloride resin (B-5)*1) | (parts) | 30 | 30 | — | — | — | — | — |
| Latex of vinyl chloride resin (B-6)*1) | (parts) | — | — | — | — | — | — | — |
| Latex of polystyrene resin (B-7)*1) | (parts) | — | — | — | — | — | — | — |
| Colloidal sulfur | (parts) | 1.0 | 1.0 | 1.0 | 1.0 | 1.0 | 1.0 | 1.0 |
| Zinc dibutyldithiocarbamate | (parts) | 1.0 | 1.0 | 1.0 | 1.0 | 1.0 | 1.0 | 1.0 |
| Zinc oxide | (parts) | 1.5 | 1.5 | 1.5 | 1.5 | 1.5 | 1.5 | 1.5 |
| Titanium oxide | (parts) | 3.0 | 3.0 | 3.0 | 3.0 | 3.0 | 3.0 | 3.0 |
| Carboxymethyl cellulose | (parts) | — | — | 0.40 | 0.30 | 2.90 | 3.20 | 1.00 |
| Polyvinyl alcohol | (parts) | — | — | — | — | — | — | — |

TABLE 1-continued

| | | | | | | | | |
|---|---|---|---|---|---|---|---|---|
| Carboxylic acid modified polyvinyl alcohol | (parts) | 0.80 | — | — | — | — | — | — |
| Polyacrylic acid | (parts) | — | 0.30 | — | — | — | — | — |
| Properties of water-soluble polymer | | | | | | | | |
| Acid amount | (mmol/g) | 1.5 | 11.0 | 3.7 | 3.7 | 3.7 | 3.7 | 3.7 |
| Viscosity of aqueous solution of water-soluble polymer | (mPa · s) | 20 | 100 | 850 | 850 | 850 | 850 | 850 |
| Solid content concentration of aqueous solution of water-soluble polymer when measuring viscosity | (mass %) | 4 | 4 | 1 | 1 | 1 | 1 | 1 |
| Evaluation | | | | | | | | |
| Surface tension | (mN/m) | 49 | 49 | 43 | 33 | 38 | 38 | — |
| Wear test (wear resistance) | | LEVEL3 | LEVEL3 | LEVEL3 | LEVEL4 | LEVEL0 | LEVEL0 | LEVEL4 |
| Amount of wear when the number of rotations is 100 (wear resistance) | (mg) | 13.3 | 13.1 | 14.5 | 9.6 | — | — | 17.9 |
| Maximum weight that can be lifted (wet grip when water is deposited) | (kg) | 7.0 | 7.0 | 7.0 | 1.0 | 5.0 | 5.0 | 3.0 |
| Maximum weight that can be lifted (wet grip when oil is deposited) | (kg) | 5.0 | 5.0 | 5.0 | 0.0 | Unmeasurable | Unmeasurable | 3.0 |
| Solvent gas permeability (resistance to permeation of chemicals) | (%) | 1.2 | 8.1 | 7.5 | 1.5 | Unmeasurable | Unmeasurable | 8.5 |
| Surface roughness of surface of protective glove | (μm) | 3 | 4 | 5 | 1 | Unmeasurable | Unmeasurable | 45 |
| Line roughness of surface of protective glove | (μm) | 2.0 | 5 | 7 | 0.7 | Unmeasurable | Unmeasurable | 20 |
| Coefficient of dynamic friction when water is deposited | — | 0.42 | 0.42 | 0.41 | 0.20 | Unmeasurable | Unmeasurable | 0.34 |
| Coefficient of dynamic frictional when IRM903 is deposited | — | 0.31 | 0.34 | 0.31 | 0.09 | Unmeasurable | Unmeasurable | 0.29 |
| Young's modulus (flexibility) | (kPa) | 500 | 510 | 530 | 180 | Unmeasurable | Unmeasurable | 170 |
| Appearance (crack) | | None | None | None | None | Powder fall | Powder fall | None |

*[1])Amount to be blended in terms of solid content (polymer component)

As shown in Table 1, the dip-molded article obtained with the latex composition for dip-molding obtained by mixing the latex of conjugated diene polymer (A) having a glass transition temperature of 10° C. or less and the latex of polymer (B) having a glass transition temperature above 10° C. is excellent in the wear resistance, as well as the wet grip when water was deposited and when oil was deposited (Examples 1 to 12).

On the other hand, when the latex of vinyl chloride resin as the latex of polymer (B) having a glass transition temperature above 10° C. was not blended, the obtained dip-molded article was inferior in the wet grip when water was deposited and when oil was deposited (Comparative Example 1).

In addition, when the latex of conjugated diene polymer (A) having a glass transition temperature of 10° C. or less was not blended, the polymer layer having sufficient strength was not able to be formed on the substrate, and the powder fall was generated, so that the wet grip when oil was deposited was unable to be measured (Comparative Example 2, 3). Further, the obtained dip-molded article was inferior in the wear resistance (Comparative Examples 2 and 3). In Comparative Examples 2 and 3, the wet grip when water was deposited was good. The reason for this is considered to be that the fiber substrate was not substantially coated with the polymer layer to be in the uncoated state, so that the state was equal to a state in which wet grip of the fiber substrate itself when water was deposited was evaluated.

In addition, when the dip-molded article was obtained with the foamed latex composition for dip-molding to which the latex of vinyl chloride resin as the latex of polymer (B) having a glass transition temperature above 10° C. was not added, the obtained dip-molded article was inferior in the wear resistance (Comparative Example 4).

Further, the latex composition for dip-molding obtained by mixing the latex of conjugated diene polymer (A) having a glass transition temperature of 10° C. or less and the latex of polymer (B) having a glass transition temperature above 10° C., and comprising the water-soluble polymer having an acid amount of 10 mmol/g or less provided the dip-molded article excellent in the wear resistance and the wet grip when water was deposited and when oil was deposited, as well as the resistance to permeation of chemicals (Examples 1 to 10, 12).

EXPLANATION OF REFERENCE NUMERAL

10 . . . Measurement sample
20 . . . Indentation test equipment
21 . . . Measuring table
22 . . . Support aim
23 . . . Horizontal aim
24 . . . Vertical moving mechanism for coarse movement
25 . . . Vertical moving mechanism for fine movement
26 . . . Stage
27 . . . Load cell
28 . . . Load shaft
29 . . . Spherical indenter
30 . . . Suction table

The invention claimed is:

1. A latex composition for dip-molding obtained by mixing a latex of conjugated diene polymer (A) having a glass transition temperature of 10° C. or less and a latex of polymer (B) having a glass transition temperature above 10° C., further comprising a water-soluble polymer having an acid amount of 10 mmol/g or less,
   wherein the water-soluble polymer is at least one selected from the group consisting of cellulose derivatives and salts thereof, and the water-soluble polymer is a carboxylic acid-modified water-soluble polymer.

2. The latex composition for dip-molding according to claim 1, wherein the conjugated diene polymer (A) is a nitrile group-containing conjugated diene polymer.

3. The latex composition for dip-molding according to claim 1, wherein a content of the conjugated diene polymer (A) is 40 parts by weight or more based on 100 parts by weight of a polymer component.

4. The latex composition for dip-molding according to claim 1, wherein the glass transition temperature of the polymer (B) is 30° C. or more.

5. The latex composition for dip-molding according to claim 4, wherein the glass transition temperature of the polymer (B) is 50° C. or more.

6. The latex composition for dip-molding according to claim 1, wherein the polymer (B) contains a monomer unit having a halogen atom.

7. The latex composition for dip-molding according to claim 6, wherein the polymer (B) is vinyl chloride resin.

8. The latex composition for dip-molding according to claim 7, wherein the vinyl chloride resin does not contain a plasticizer.

9. The latex composition for dip-molding according to claim 7, wherein the vinyl chloride resin is a copolymer of vinyl chloride and a monomer copolymerizable with the vinyl chloride.

10. The latex composition for dip-molding according to claim 1, further comprising a sulfur cross-linking agent.

11. The latex composition for dip-molding according to claim 1, wherein surface tension at 25° C. is 34 to 72 mN/m.

12. A dip-molded article comprising a latex composition for dip-molding,
having a surface roughness of 20 μm or less, and
a coefficient of dynamic friction of 0.10 or more on a surface on which a test oil IRM903 is deposited,
wherein the latex composition for dip-molding is obtained by mixing a latex of conjugated diene polymer (A) having a glass transition temperature of 10° C. or less and a latex of polymer (B) having a glass transition temperature above 10° C., and
the latex composition for dip-molding further comprises a water-soluble polymer having an acid amount of 10 mmol/g or less.

13. A dip-molded article comprising the latex composition for dip-molding according to claim 1.

14. A dip-molded article obtained by immersing a substrate in the latex composition for dip-molding according to claim 1.

15. The dip-molded article according to claim 13, wherein a film thickness of a polymer layer comprising the latex composition for dip-molding is 0.05 to 1.0 mm.

16. The latex composition for dip-molding according to claim 1, wherein a content of the water-soluble polymer is 0.1 to 5 parts by weight based on 100 parts by weight of a polymer component.

17. The latex composition for dip-molding according to claim 1, wherein a content of the water-soluble polymer is 0.1 to 1.3 parts by weight based on 100 parts by weight of a polymer component.

* * * * *